(12) United States Patent
Bracey et al.

(10) Patent No.: US 9,349,493 B2
(45) Date of Patent: May 24, 2016

(54) SYSTEM FOR STORAGE AND TRANSPORTATION OF SPENT NUCLEAR FUEL

(71) Applicant: AREVA Inc., Lynchburg, VA (US)

(72) Inventors: William Bracey, West Orange, NJ (US); Thomas van Riper, Rockville, MD (US); Uwe Wolf, Silver Spring, MD (US); Jayant Rajabhau Bondre, Clarksville, MD (US); Kamran Tavassoli, Great Falls, VA (US); Raheel Haroon, Columbia, MD (US)

(73) Assignee: Areva Inc., Lynchburg, VA (US)

( * ) Notice: Subject to any disclaimer, the term of this patent is extended or adjusted under 35 U.S.C. 154(b) by 169 days.

(21) Appl. No.: 13/747,398

(22) Filed: Jan. 22, 2013

(65) Prior Publication Data
US 2013/0322589 A1 Dec. 5, 2013

Related U.S. Application Data

(60) Provisional application No. 61/588,550, filed on Jan. 19, 2012.

(51) Int. Cl.
*G21F 5/008* (2006.01)
*G21F 5/12* (2006.01)
(Continued)

(52) U.S. Cl.
CPC ............. *G21F 5/012* (2013.01); *G21C 19/07* (2013.01); *G21C 19/40* (2013.01); *G21F 5/008* (2013.01); *G21F 5/10* (2013.01); *G21F 5/12* (2013.01); *G21F 5/14* (2013.01)

(58) Field of Classification Search
USPC ........................................................ 376/272
See application file for complete search history.

(56) References Cited

U.S. PATENT DOCUMENTS

| 4,513,205 A | * | 4/1985 | Splinter ............. 250/507.1 |
| 4,634,875 A | | 1/1987 | Kugeler |
| 4,780,269 A | | 10/1988 | Fischer |
| 4,996,019 A | | 2/1991 | Catalayoud |

(Continued)

FOREIGN PATENT DOCUMENTS

| JP | 2002-243888 A | 8/2002 |
| JP | 2003-207593 A | 7/2003 |

(Continued)

OTHER PUBLICATIONS

International Search Report and Written Opinion mailed Nov. 26, 2013, issued in corresponding International Application No. PCT/US2013/022597, filed Jan. 22, 2013, 14 pages.

(Continued)

*Primary Examiner* — Jack W Keith
*Assistant Examiner* — Sean P Burke
(74) *Attorney, Agent, or Firm* — Christensen O'Connor Johnson Kindness PLLC

(57) ABSTRACT

A concrete storage module (26) is adapted to slideably receive a cylindrical canister assembly (12) therein. Heat dissipation fins (62) and a tubular heat shield (96) are disposed within the module to help dissipate heat emitted from the nuclear fuel assemblies stored in the canister to air flowing through the module. The canister assembly (12) is composed of a basket assembly (70) constructed from multi-layer structural plates disposed in cross-cross or egg carton configuration. A single port tool (106) is provided for draining water from the canister (12) and replacing the drain water with make-up gas. The single port tool is mounted in the cover (100) of the canister and is in fluid flow communication with the interior of the canister.

17 Claims, 20 Drawing Sheets

(51) Int. Cl.
*G21F 5/012* (2006.01)
*G21F 5/10* (2006.01)
*G21F 5/14* (2006.01)
*G21C 19/07* (2006.01)
*G21C 19/40* (2006.01)

(56) References Cited

U.S. PATENT DOCUMENTS

| | | | |
|---|---|---|---|
| 5,114,666 A | | 5/1992 | Ellingson |
| 5,898,747 A | * | 4/1999 | Singh .......................... 376/272 |
| 2002/0163989 A1 | * | 11/2002 | Dallongeville ......... G21F 5/012 376/272 |
| 2006/0171500 A1 | | 8/2006 | Pennington |
| 2007/0274430 A1 | | 11/2007 | Chiocca |
| 2008/0123798 A1 | | 5/2008 | Andre |
| 2011/0051883 A1 | * | 3/2011 | McInnes et al. .............. 376/462 |

FOREIGN PATENT DOCUMENTS

| | | |
|---|---|---|
| JP | 2004-156930 A | 6/2004 |
| JP | 2007-205931 A | 8/2007 |
| KR | 10-2010-0081865 A | 7/2010 |

OTHER PUBLICATIONS

Communication Pursuant to Rule 164(1) EPC mailed Aug. 12, 2015, issued in related European Application No. 13781208.7, filed Jan. 22, 2013, 5 pages.

Office Action mailed Dec. 16, 2015, issued in related Chinese Application No. 201380011394.4, filed Jan. 22, 2013, 26 pages.

Extended European Search Report mailed Dec. 11, 2015, issued in related European Application No. 13781208.7, filed Jan. 22, 2013, 13 pages.

* cited by examiner

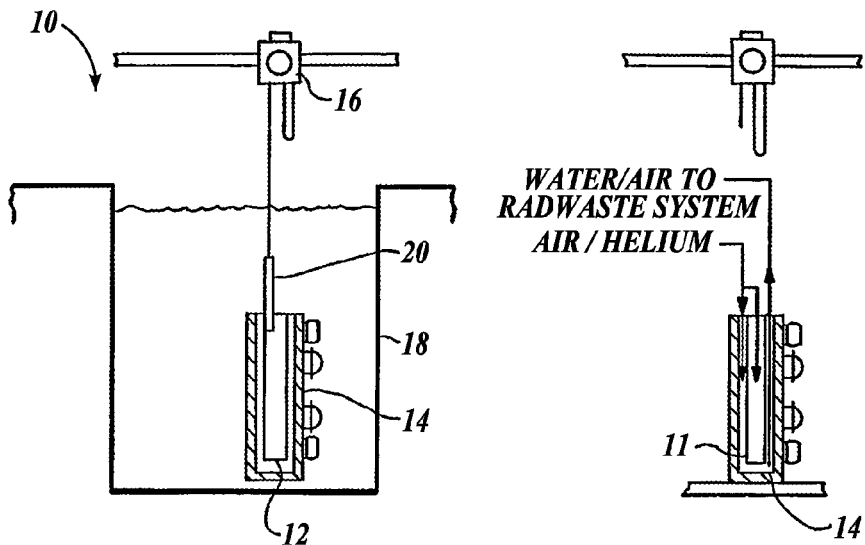
Fig.1.
*(PRIOR ART)*
Fig.2.
*(PRIOR ART)*
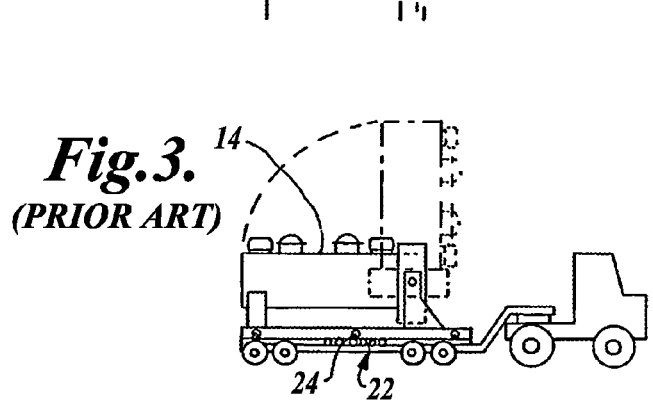
Fig.3.
*(PRIOR ART)*
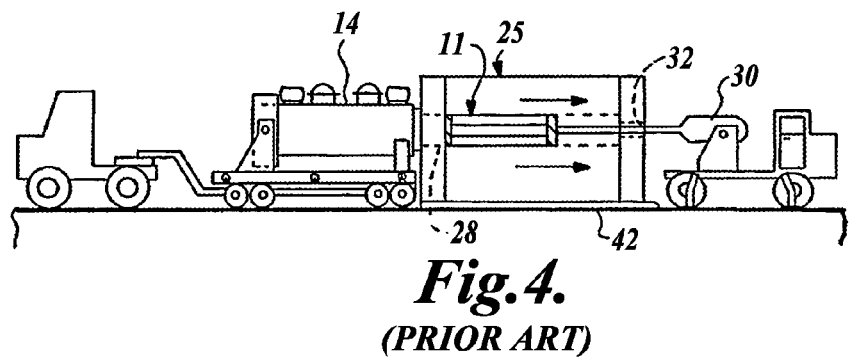
Fig.4.
*(PRIOR ART)*

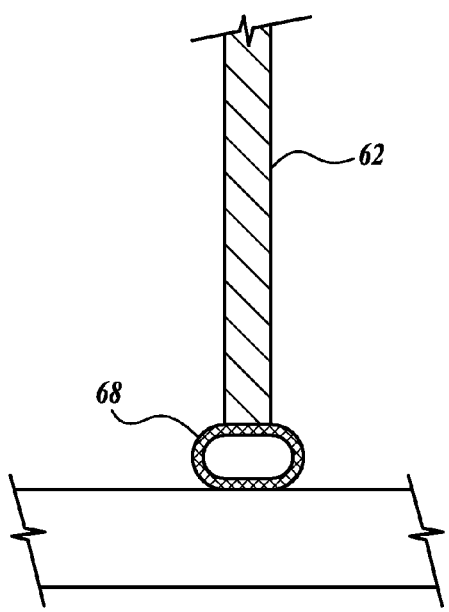 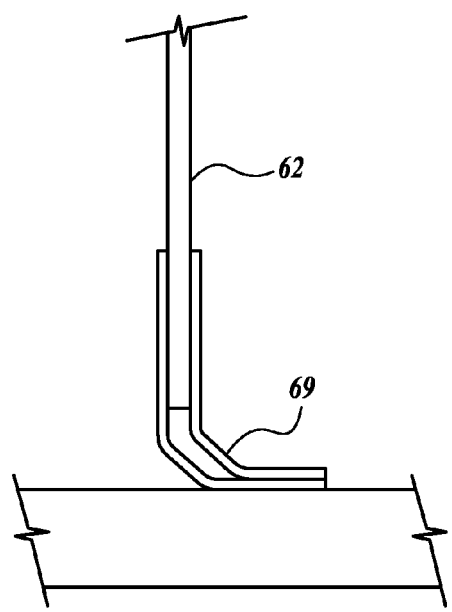
*Fig.8A.*  *Fig.8B.*

SYSTEM FOR STORAGE AND TRANSPORTATION OF SPENT NUCLEAR FUEL

CROSS-REFERENCE TO RELATED APPLICATION

This application claims the benefit of U.S. Provisional Application No. 61/588,550, filed Jan. 19, 2012, the disclosure of which is hereby expressly incorporated by reference in its entirety herein.

BACKGROUND

Part of the operation of a nuclear power plant is the removal and disposal of irradiated nuclear fuel assemblies. Most early reactors were originally built to store from three to five years' capacity of irradiated fuel assemblies in a storage pool. From the storage pool, the irradiated fuel assemblies could be reprocessed or sent to long-term storage. However, as a result of uncertainties in the federal policies relating to reprocessing of irradiated fuel and also in the establishment of permanent irradiated fuel dumps, on-site irradiated fuel storage facilities have been stressed to their capacity for storing these irradiated fuel assemblies. To prevent the forced shutdown of nuclear power plants as a result of the overcrowding of storage pools, a number of near-term irradiated fuel storage concepts have been developed and/or utilized.

One such near-term concept in use is the dry storage of irradiated fuel. Nonetheless, early developments in irradiated fuel dry storage in the United States anticipated that this would be a short-term measure, with removal of irradiated fuel to more permanent geologic storage required by Federal Law starting in 1998. As it became apparent that this would not happen, and that interim dry storage would be a larger scale and longer term effort, the following change occurred in the demands placed on dry storage systems.

As the initial inventory of low burnup, long cooled irradiated fuel residing in pools was transferred to dry storage, and as power plants increased the enrichment and burnup of their fuel, the need to store fuel with ever greater residual decay heat has grown. The fuel gives off heat from the decay of the radioactive elements, and so the storage system must be able to keep the fuel cladding cool enough that it does not deteriorate during the dry storage period without the use of active coolers such as fans. Early systems were developed with a capability for about 24 kW of decay heat per system; current needs are in excess of 40 kW.

Various structures have been developed to transport and store the irradiated fuel in secure canisters. One type of canister uses a lattice structure to form compartments to locate the fuel within the transport and storage canisters. The lattice structure is of "egg crate" design composed of interlocking transverse plates. However, existing baskets of egg crate design have used very expensive materials. Such materials include, for example, borated stainless steel, extruded profiles of enriched boron aluminum and metal matrix composites. Thus, a need exists of constructing transport and storage canisters from lower cost and more common materials.

A system was developed for horizontal modular dry irradiated fuel storage, as described in U.S. Pat. No. 4,780,269, the disclosure of which is hereby expressly incorporated by reference. However, there exists a need for improvements to that system. Embodiments of the present disclosure described herein are directed to fulfilling this and other needs.

SUMMARY

This summary introduces a selection of concepts in a simplified form that are further described below in the Detailed Description. This summary is not intended to identify key features of the claimed subject matter, nor is it intended to be used as an aid in determining the scope of the claimed subject matter.

A system for transportation and storage of spent nuclear fuel disclosed herein enhances the internal heat transfer during storage by the efficient use of high strength steel to construct the storage canisters, allowing more room for conductive material, aluminum or copper. The rejection of heat external to the fuel storage canister is enhanced by the mechanical application of fins to the canister outside cylindrical surface, or by the use of efficient and effective heat shields between the canister and the concrete storage module, including designs that increase the surface area for convective heat rejection from the heat shields, in comparison to conventional heat shields.

The present disclosure employs lower cost materials employed in a novel way to construct an "egg crate" type transport and storage canisters for the irradiated fuel. The plates of the egg crate structure employ low alloy, high strength steel plates that encase aluminum and a thin sheet of a metallic base neutron absorbing material forming a functionally graded structure where the steel provides structural stability, the aluminum conducts heat, and the neutron absorber prevents a neutron chain reaction.

In accordance with further aspects of the present disclosure, a canister for the transportation and storage of nuclear fuel assemblies includes a basket assembly receivable into a canister shell. The basket assembly includes a plurality of interlocking structural plates that are disposed in spaced parallel relationship to each other in a first direction, as well as a plurality of structural plates disposed in a second direction transverse to the first direction. The structural plates including transverse slots formed along the plates so that the slots of the structural plates disposed in a first direction engage with the slots of the structural plates disposed in the second, transverse direction. The structural plates are composed of a plurality of separate layers, including outer layers composed of a structural material, at least one inner layer composed of heat conducting material, and at least one inner layer composed of neutron-absorbing material.

In accordance with further aspects of the present disclosure, the outer layers of the structural plates are formed to encase the inner layers of the structural plates. In this regard, the margins of the outer layers extend over the edges of the inner layers and are joined to each other.

In a further aspect of the present disclosure, elongated locking keys extend along and engage with adjacent edge portions of adjacent structural plates to lock the adjacent edge portions together and to align the adjacent edge portions together. In this regard, grooves are formed along the edge portions of the structural plates. These grooves are sized to closely receive the locking key therein. Also, holes are formed in the structural plates, whereby the locking key passes through the holes of the structural plates that extend transversely to the length of the locking keys.

In accordance with a further aspect of the present invention, transition rails extend lengthwise of the canister at the outer perimeter of the basket assembly to interconnect the structural plates. The transition rails have an outer curvature in the direction transverse to the length of transition rails that correspond to the circumference of the canister. In addition, the transition rails are at least partially hollow to receive a stiffening structure therein to enhance the structural integrity and rigidity of the transition rails.

In accordance with a further aspect of the present disclosure, storage modules for containing nuclear fuel assemblies in storage canisters include concrete bottom, side, and top walls. The modules are configured for air flow therethrough by natural convection to dissipate the heat emitted from the nuclear fuel assemblies. At least one heat transfer structure is disposed within the module and positioned to transfer heat from the canister to the air flowing through the module. In addition, at least one heat shield is disposed in the module to shield the interior of the module from heat emitted from the nuclear fuel assemblies.

In accordance with another aspect of the present disclosure, the concrete top, bottom and side walls of the module are composed of a mixture of concrete and metallic fibers serving to reinforce the concrete.

In accordance with a further aspect of the present disclosure, the heat transfer structure includes fins that are disposed within the module for transferring heat from the canister to the air flowing through the module. The fins are placed into contact with the canister once the canister is positioned within the module.

In accordance with a further aspect of the present disclosure, a heat shield structure and/or heat transfer structure includes barriers that extend along one or more of the side walls, top wall and bottom wall of the module. Such barrier is spaced from the module walls to provide an air flow interface between the barrier and the module walls. The heat barrier structure is selected from the group consisting of plate structures, corrugated wall structures, and tubular wall structures.

In accordance with another aspect of the present disclosure, a single port tool is provided for the canister for fluid flow communication with the interior of the canister for draining water from the canister and replacing the draining water with make-up gas. The single port tool includes a single opening formed in the canister and a shield plug insertable within the opening. The single sport tool is in fluid flow communication with the interior of the canister and has a first passageway therethrough for receiving a drain tube for draining the water from the canister, and a second opening therethrough for receiving make-up gas and directing such make-up gas to the interior of the canister.

In a further aspect of the present disclosure, the canister has a housing and a cover, and a single port is formed in the cover of the canister for reception of the single port tool.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 1-4 are various views of a previously designed horizontal modular dry irradiated fuel storage system;

FIG. 8A is an enlarged fragmentary view of a heat transfer fin used in a dry storage module;

FIG. 8B is a view similar to FIG. 8A of another heat transfer fin used in the dry storage module;

DETAILED DESCRIPTION

Figure 5:
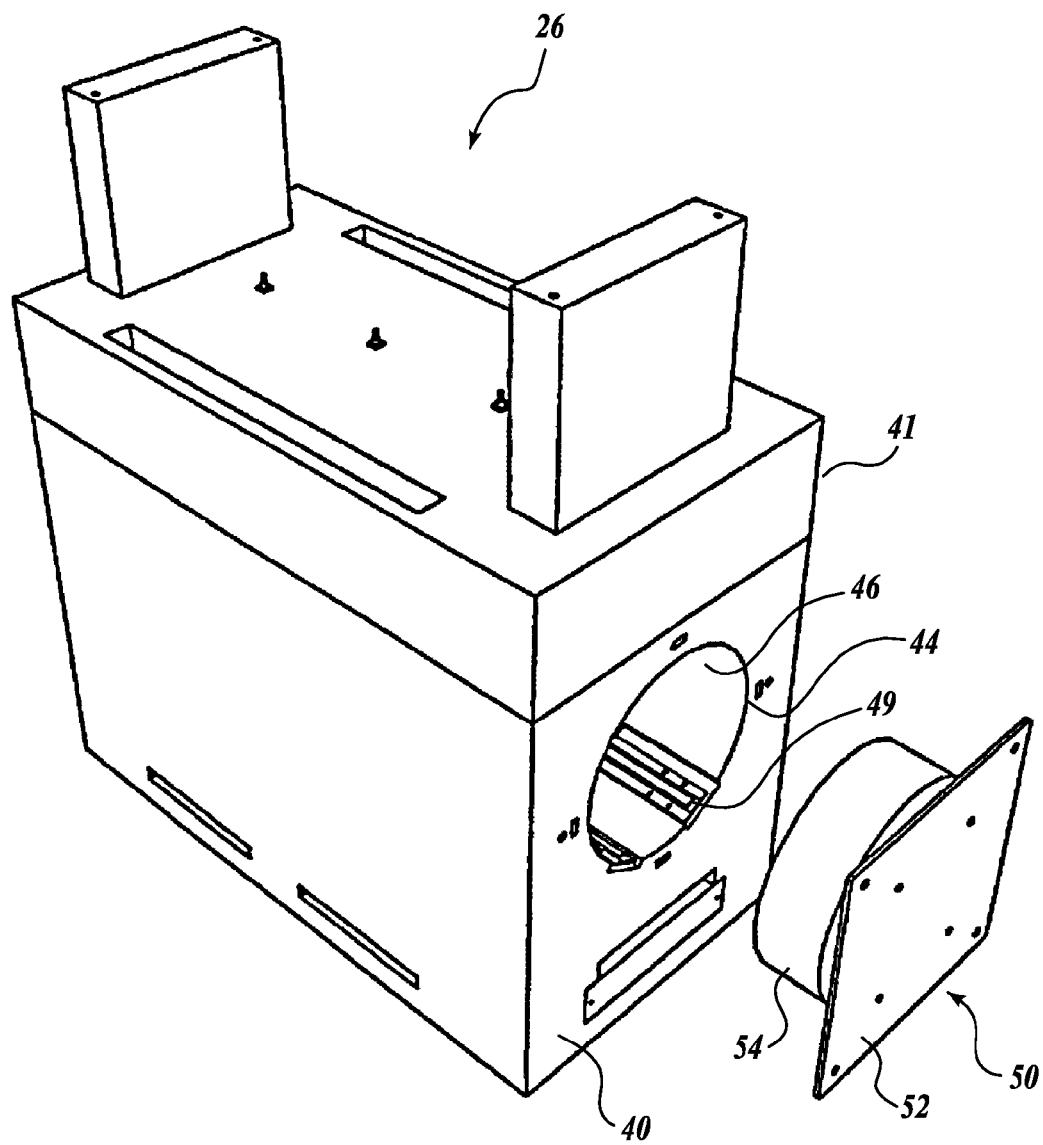
FIG. 5 is an isometric view of a horizontal dry storage module in accordance with the present disclosure.

A horizontal modular dry irradiated (e.g., spent) fuel storage system will first be described. With reference to FIGS. 1-4, a horizontal modular dry irradiated fuel storage system 10 in accordance with embodiments of the present disclosure is presented. In addition, processes for storing irradiated fuel are described. As set forth in greater detail below, the systems and processes described herein are improvements to previous systems and processes described in U.S. Pat. No. 4,780,269 (as seen in FIGS. 1-4), the disclosure of which is hereby expressly incorporated by reference.

Referring to FIG. 1, the system 10 uses a specially designed dry shielded canister assembly 12, which is shown in greater detail in FIGS. 5-10, as described in greater detail below. The canister assembly 11 is inserted into a transfer cask 14. The transfer cask 14 and canister assembly 11 can be placed by a crane 16 into an irradiated fuel storage pool 18 filled with water (see FIGS. 1 and 2). Irradiated fuel contained in fuel assemblies (see, e.g., fuel assembly 20) can be stored in the pool 18.

To remove the irradiated fuel from the pool 18, the fuel is placed in the canister assembly 11, and appropriate seals and covers (as described below) are affixed to the canister assembly 11 before the transfer cask 14 is removed from the pool 18. Referring to FIG. 2, upon removal from the pool 18, water is forced out of both the canister assembly 11 and the transfer cask 14 with a pressurized gas being applied through selected ports of the canister assembly and cask. The canister assembly 11 is further dried by using a vacuum pump to evacuate the residual water from the canister assembly 11. After evacuation of the canister assembly 11, helium gas is pumped into the canister assembly 11. As the transfer cask 14 (containing the canister assembly 11 and irradiation fuel assemblies 20) is removed from the pool 18, appropriate radiation shielding is provided for the contained irradiated fuel assemblies by the shielded end plugs of the canister assembly 11 and the transfer cask 14.

Referring now to FIG. 3, the transfer cask 14 can be loaded into a horizontal position onto a transfer trailer 22 having a specially designed skid 24. The skid 24 allows the transfer cask 14 to be moved in three dimensions to permit alignment of the cask 14 with a horizontal storage module 25, which can be seen in FIG. 4, for dry storage of the canister assembly 11.

Referring to FIG. 4, the cask 14 is aligned with a port 28 in the dry storage module 25 to extract the canister assembly 11 from the transfer cask 14 for storage in the horizontal storage module 25. In the illustrated embodiment, a hydraulic ram 30 is at least partially insertable through a second port 32 at the opposite end of the dry storage module 26 to extract the canister assembly 11 from the transfer cask 14 for storage in the horizontal storage module 25. Alternatively, a winch (not shown) or another extraction device could be used in place of ram 30 to extract the canister assembly 11 from the transfer cask 14. It should further be appreciated that the reverse operation of pushing the canister assembly 11 into the dry storage module 25 can also be accomplished.

Referring to FIGS. 5-10, detailed views of an improved horizontal dry storage module 26 are provided. The horizontal dry storage module 26 includes a housing 40 having a top section 41. The housing 40 is in block or rectilinear form and is preferably constructed from reinforced concrete, which may be positioned on a load-bearing foundation 42 (see, e.g., FIG. 4). In a previous design, the housing 40 was formed from concrete reinforced with rebar. However, in the improved design, the housing 40 is reinforced with metal fiber, for example, steel fiber, to increase blast and earthquake resistance and provide long-term crack resistance. The metal fiber also reduces shrinkage and cracking of the concrete in the short term, thereby decreasing water incursion and also increasing spalling resistance in the long term. In sum, the use of steel or other comparable fibers to reinforce the concrete increases the toughness, tensile strength, density, and dynamic strength of the concrete. It should be appreciated that vertical storage modules or other storage modules (not shown), having housings that are reinforced with metal fiber, for example, steel fiber, are also within the scope of the present disclosure. Also, it is to be appreciated that the use of metal fiber to reinforce the concrete can be used in lieu of or in addition to primary and secondary rebars used in standard concrete construction. Also, it is to be appreciated that other high-strength fibers can be used in place of or in addition to metal fibers, such as fiberglass fibers, glass fibers, or carbon fibers.

Figure 6:
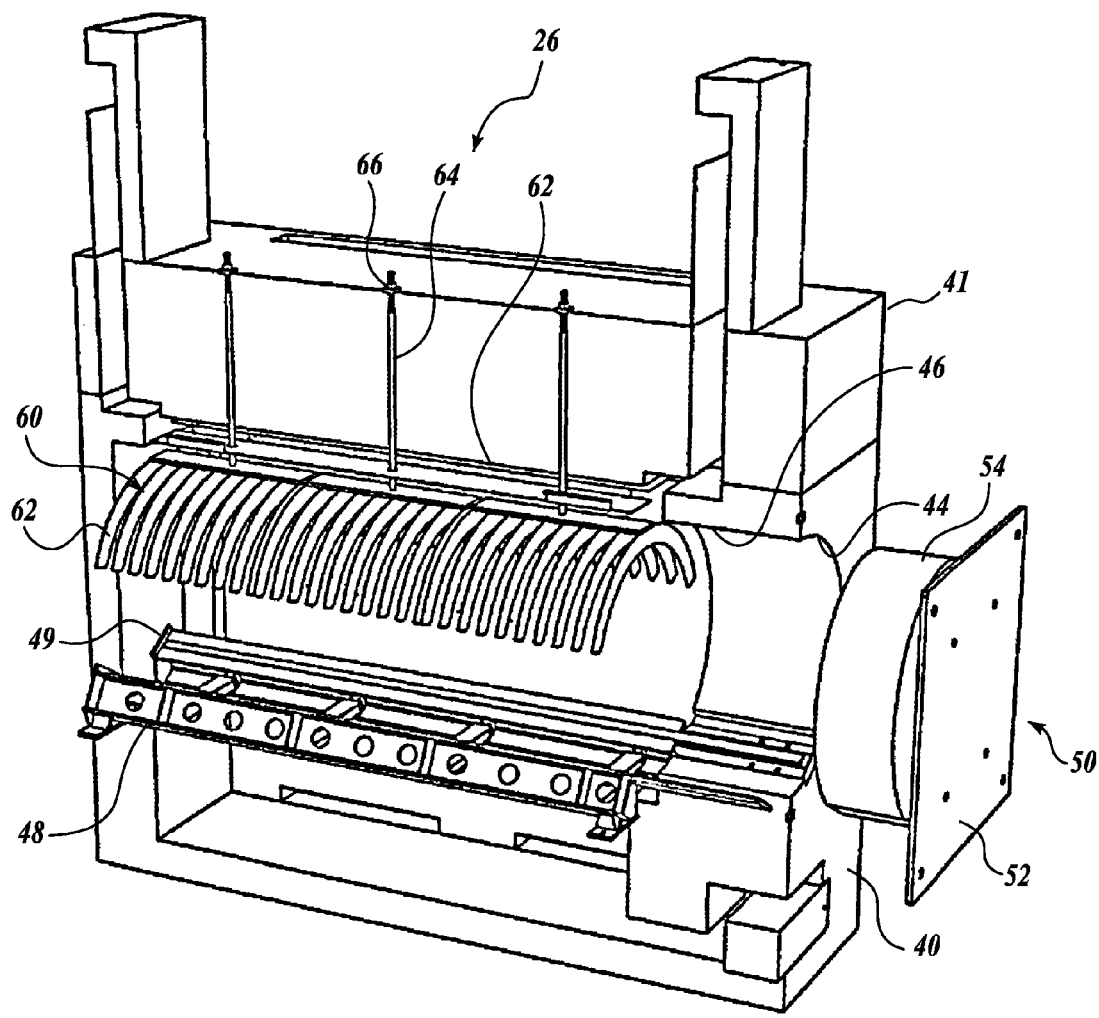
FIG. 6 is a view similar to FIG. 5, but with portions of the exterior of the module removed so that the interior structure of the module is visible.
Figure 7:
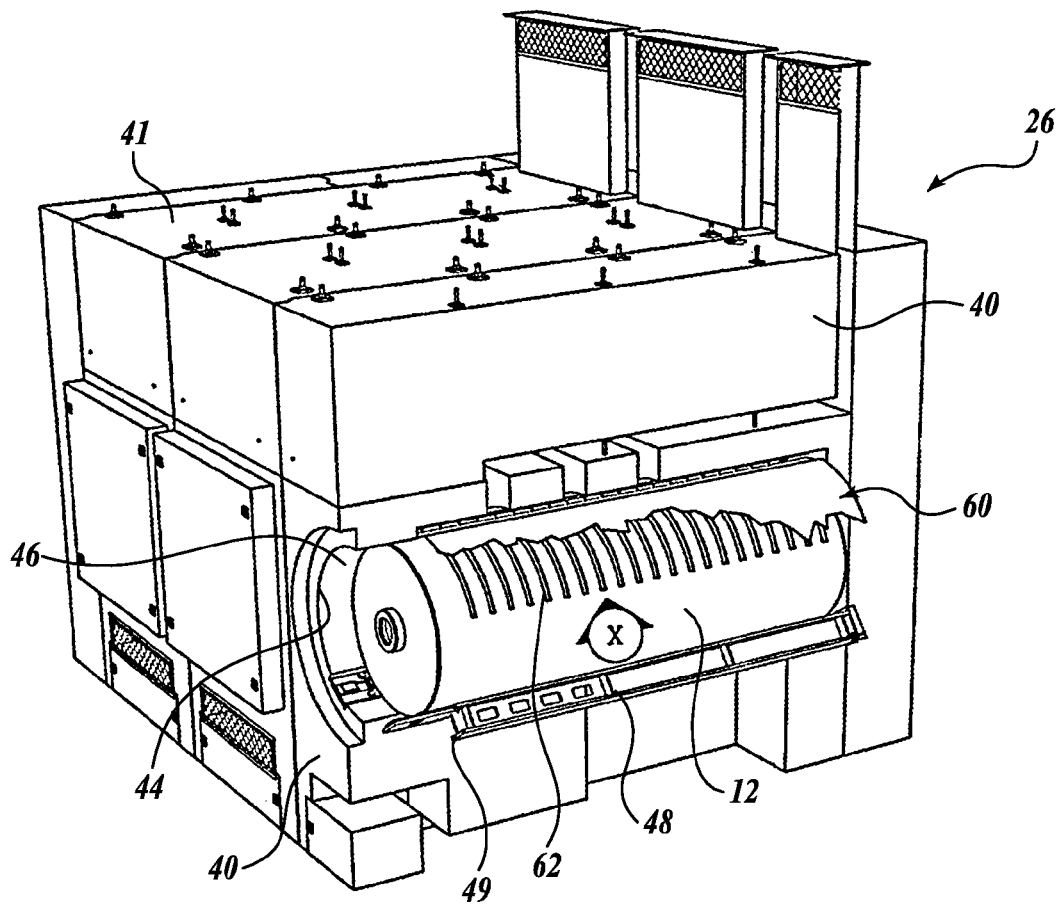
FIG. 7 is another view of a group of storage modules positioned side by side, with the module in the foreground showing portions removed so that the interior of the module is visible.

The housing 40 includes an inlet 44 at one end and an interior volume 46 designed for receiving and containing a canister assembly 12. Embedded in housing 40 is an underlying support assembly 48 to support the canister assembly 12 when it is fully inserted into housing 40. The support assembly 48 may also be configured to allow the canister assembly 12 to slide easily in and out of the housing 40. As shown in FIGS. 5-7, the support assembly includes parallel slide rail assemblies 49 extending along the housing in the lower portion of the interior volume 46. The slide rails may include slide strips composed of material that is galvonically compatible with the canister 12 and durable under the radiation level and temperature within interior volume 46. The slide rails themselves may be composed of such material or a coating or surface treatment may be applied to the slide rails.

The housing 40 includes a closure device 50 to cover the inlet 44. The closure device 50 may be constructed from steel and/or concrete and/or other appropriate radiation protection media. The closure device includes an inner, round-shaped cover plug 54 and an outer hat plate 52 that is sized to overlap the front wall of the housing surrounding the inlet 44. The wet plug 54 closely fits within inlet 44. As can be seen in FIGS. 5 and 6, the closure device 50 can be appropriately positioned in place when a canister assembly 12 is disposed in the module 26.

Referring to FIG. 7, the housing 40 may be designed and configured to allow similar housings 40 to be placed adjacent other housings, which may be interlocked therewith. Therefore, several housings can be stacked together in series to provide additional shielding to minimize radiation leakage.

Referring to FIGS. 6 and 7, the horizontal dry storage module 26 may include a heat dissipation assembly 60. In the illustrated embodiment, the heat dissipation assembly 60 includes a plurality of curved, relatively thin fins 62 spaced along the module 26. The fins 62 are either lowered onto, or clamped like a clamshell onto, the outer surface of the canister assembly 12 after the assembly is installed in the module 26. The fins 62 enhance convective heat transfer from the canister surface to the air flowing through the module 26.

As can be seen in FIG. 6, in one embodiment of the present disclosure, the heat dissipation assembly 60 consists of a series of curved fins that are mounted to the underside of a longitudinal bar 64. The bar in turn depends from a series of rods 66 that extend through the top section 41 of the housing 40 to terminate at threaded upper end portions that engage threaded fasteners 66. The heat dissipation assembly is initially retracted, positioned at the top or roof of the module 26 by rotation of fasteners 66 on rods 64. Once the canister assembly 12 has been inserted within module 26, the fasteners 46 are used to lower the bar 64 and associated fins 62 down onto the upper surface of the canister.

Although in FIG. 6, the upper threaded ends of bars 64 are shown as protruding above the upper surface of housing top section 41, instead the upper end of the rods 64, as well as threaded fastener 66, may be disposed below the top surface of top section 41. In this regard, wells or sockets may be formed in the upper surface of the top section 41, so that once the assembly 60 has been deployed downwardly against canister assembly 12, the wells or sockets can be plugged or otherwise securely closed off.

Rather than being constructed as shown in FIGS. 6 and 7, the heat dissipation assembly 60 may be constructed in two separate sections, with each section hinged to the interior of housing 40, for example, along the lower side portions of the housing. Once canister assembly 12 has been installed in the module 26, such hinged fin sections could be rotated to bear against the exterior of canister assembly 12 in a clamshell-like arrangement.

Rather than constructing the heat dissipation assembly 60 as a movable unit, the assembly can be formed from stationary fins, for example, fins 62' or 62" shown in FIGS. 8A and 8B. Flexible, heat transmitting interfaces 68 or 69 are provided along the edges of fins 62' and 62" that face the canister 12. In FIG. 8A, the interface 64 is in the form of a hollow, bulbous shape that can be deformed when the canister 12 is slid into module 26. As shown in FIG. 8A, the interface forms an oval or elliptical shape when pressed against the exterior of canister assembly 12. In FIG. 8B, the interface is in the form of a flexible lip assembly 69 that flexes and presses against the exterior of canister assembly 12 when the canister is slid into place within module 26. As noted above, both of these interfaces are highly heat conductive. The fins 62 may be constructed from aluminum or any other suitable metal or non-metal material designed for heat conduction and collection.

Figure 9:
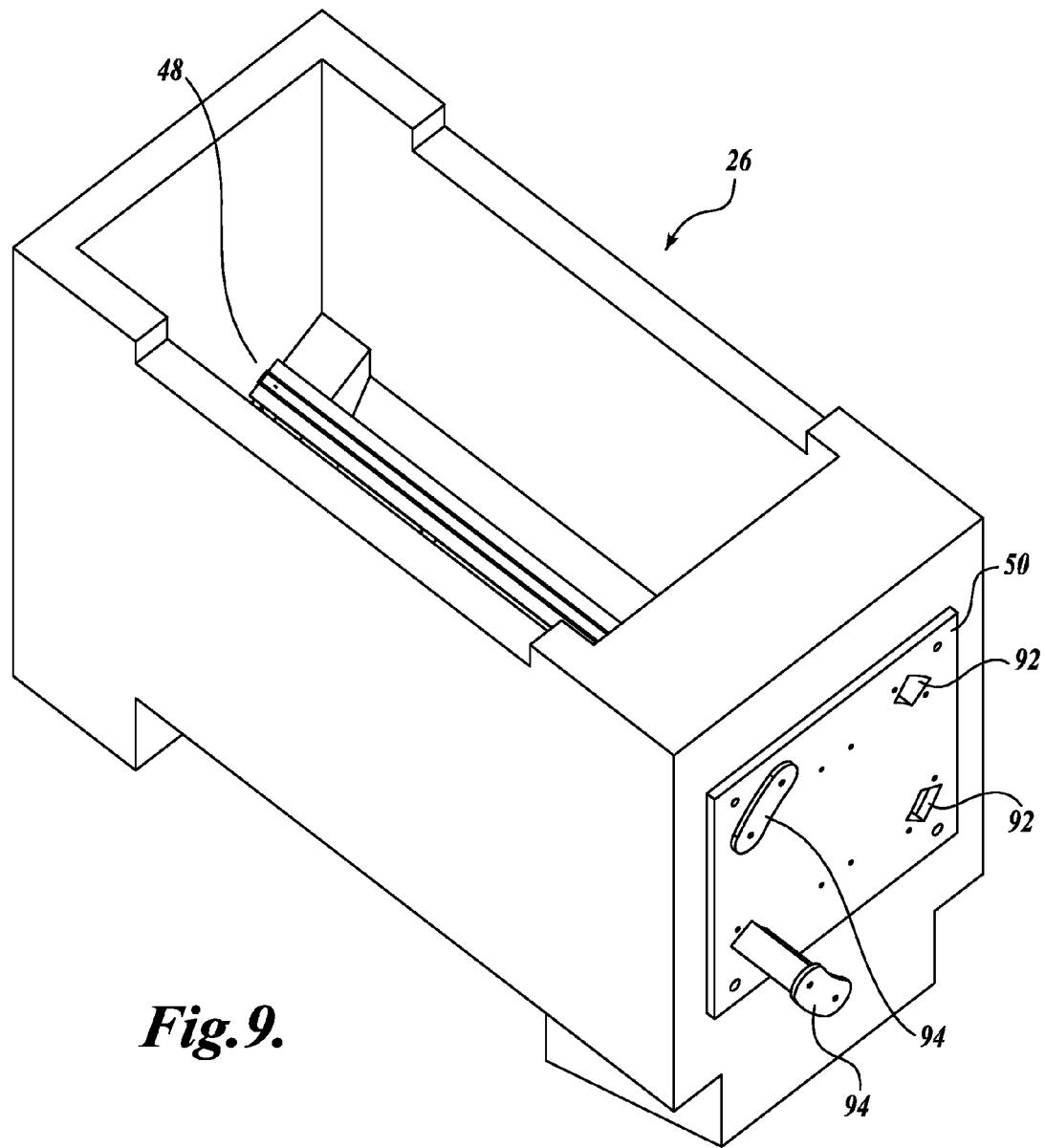
FIG. 9 is an isometric view of a dry storage module with a top portion thereof removed.

Referring to FIG. 9, one or more access ports 92 may be provided in the front wall of the module 26 and on plate 50 for inspection of the module 26 interior space 46 and the surface of the canister assembly 12 during long term service, off-normal events, etc. As seen in FIG. 9, the ports 92 maybe closed off by suitable shielding plugs 94. The ports 92 may be various configurations and at various locations on the front wall and plate 52.

Figure 10:
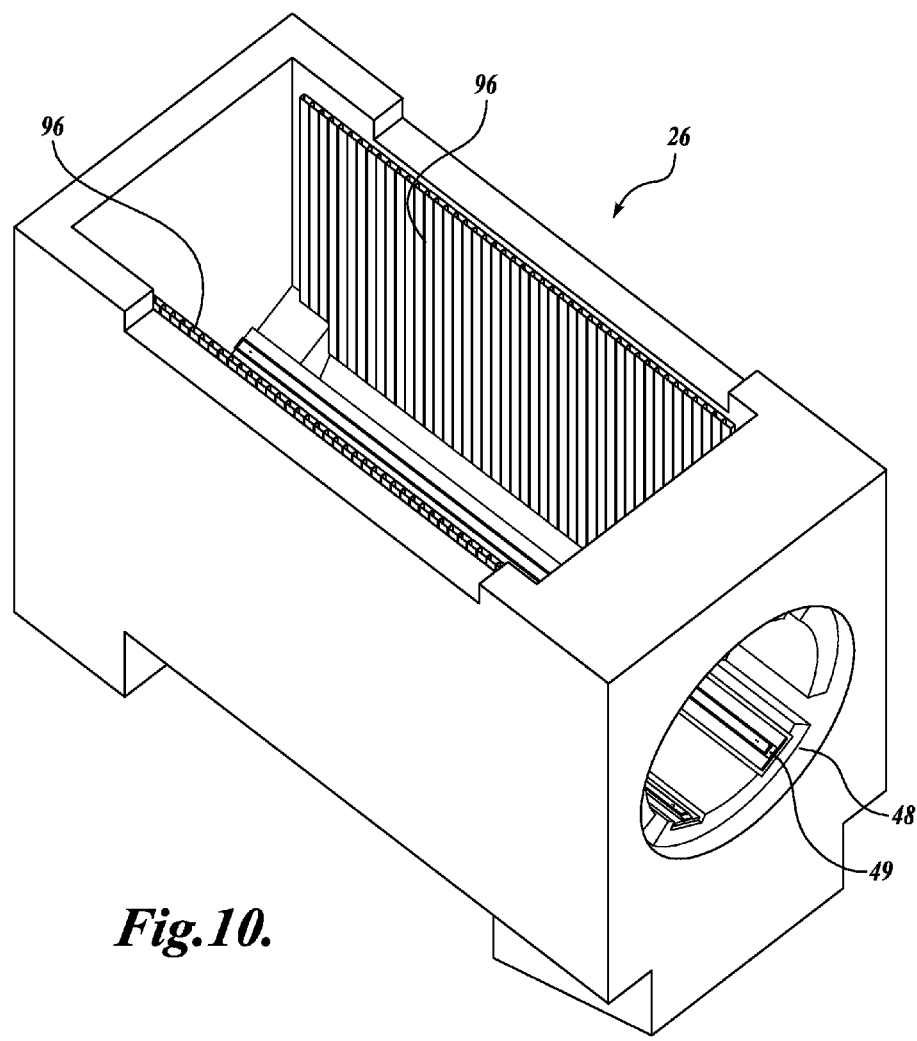
FIG. 10 is a view similar to FIG. 9, but with heat shields as mounted within the dry storage module.

Referring to FIG. 10, tubular heat shields 96 are positioned in the interior space 46 of the module to increase the surface area for transferring radiant heat from the canister 12 the air flowing through the module 26 relative to if the shield was composed of a flat plate, while at the same time protecting the housing 40 (which is made from reinforced concrete) from excessive heat. The heat shields 96 can be composed of standard square or rectangular cross-sectional metallic tubes, for example, steel or aluminum, or other heat conducting material. The individual tubes can be secured adjacent to each other by welding, mechanical fastening, or other expedient means. A mechanical fastener could include rods that extend transversely through the tubes. Alternatively, transverse tie rods could extend transversely over the exterior of the tubes, with the tie rods welded or otherwise fastened to the tubes. Also, the surface of the shields 96 that face canister 12 can be treated to increase their radiant emissivity, and thus increase their ability to absorb or otherwise capture infrared heat from canister assembly 12. The tubular shields 96 are mounted to the interior side walls and top walls of the housing 40 by suitable brackets thereby to space the shields from the adjacent walls of the housing 40. This provides a relatively cool layer of air between the shield and the concrete wall of the canister assembly 12 thereby to protect the concrete from excessive heat, which of course can weaken the structural integrity of the concrete.

Rather than using heat shields 96 of tubular construction, the heat shields can be of other constructions, including one or more substantially flat plates or a plate of corrugated construction, with the corrugation taking many cross-sectional shapes, such as semi-circular, rectilinear, triangular, etc. Also of course these alternative constructions for heat shields 96 can be composed of various materials having different levels of radiant heat absorption and heat conduction.

As noted above, the heat shields 96 enhance the overall heat rejection capability of canister assembly 12 by increasing the surface area for heat rejection. The heat shield is heated both by radiation and by air flowing from the canister to the near surface of the shield by natural convention. The tubular or corrugated heat shields increase the surface area compared to a flat heat shield, thus making the heat shield more effective for transferring heat to the cooler air which flows inside the tubes composing the shields 96, as well as the air that flows between the tubes and concrete wall of the housing 40. This directly increases the surface area available for transferring heat away from the canister 12. Also, the tubes that compose shield 96 provide two separate shielding surfaces, one facing the canister and one facing the concrete wall, thereby increasing the ability of the shield 96 to serve as a heat barrier and protecting the concrete walls of the housing 40 from being overheated.

Figure 11:
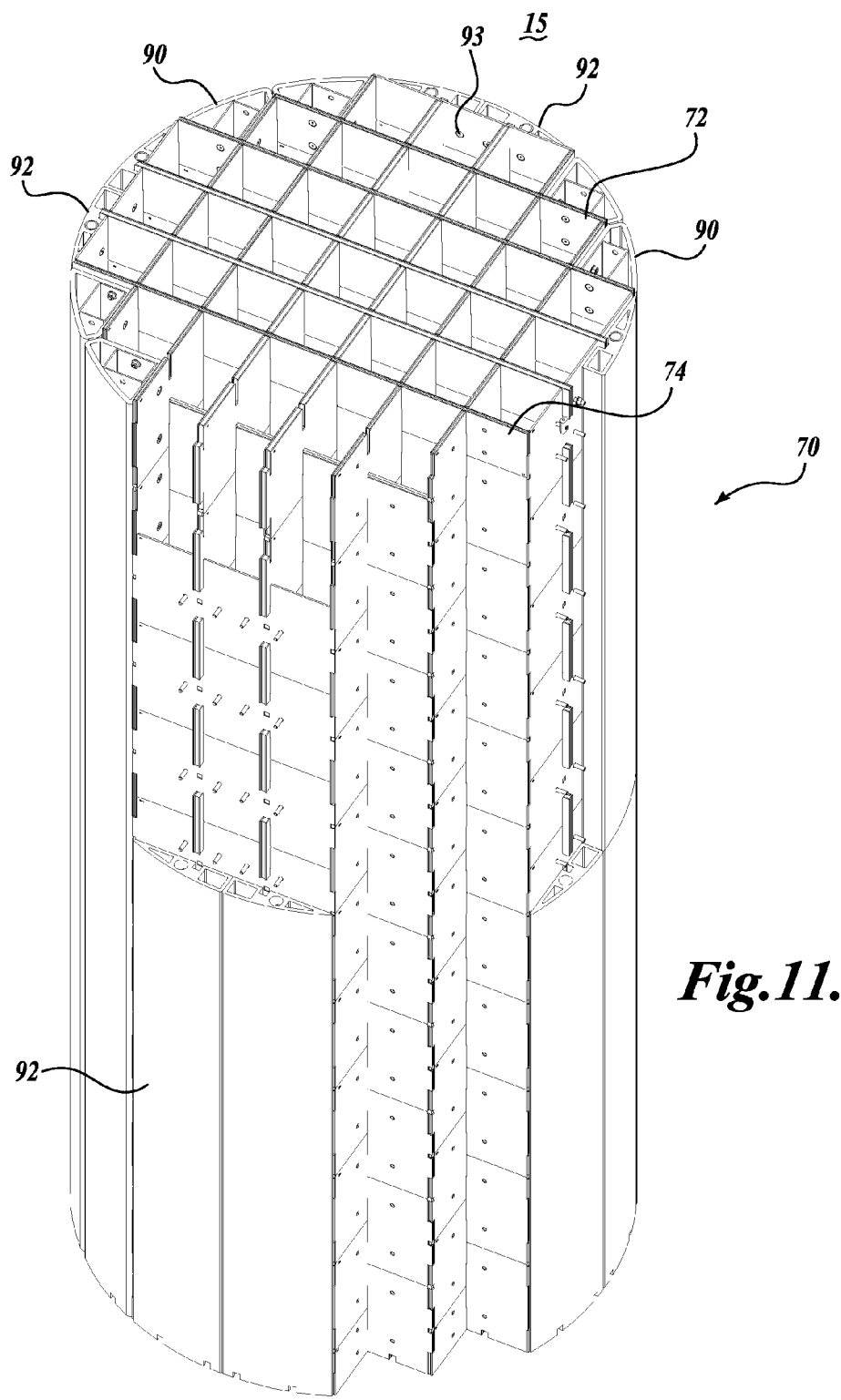
FIG. 11 is an isometric view of the basket portion of a storage canister assembly, with portions broken away to illustrate the interior construction of the basket portion.

Referring to FIG. 11, a basket assembly 70 for being disposed in the canister 12 to hold fuel assemblies 20 will now be described in greater detail. The basket assembly 70 is in the form of a rack positioned internal to the canister assembly 12 for locating and supporting the fuel assemblies during storage and transportation.

Figure 12:
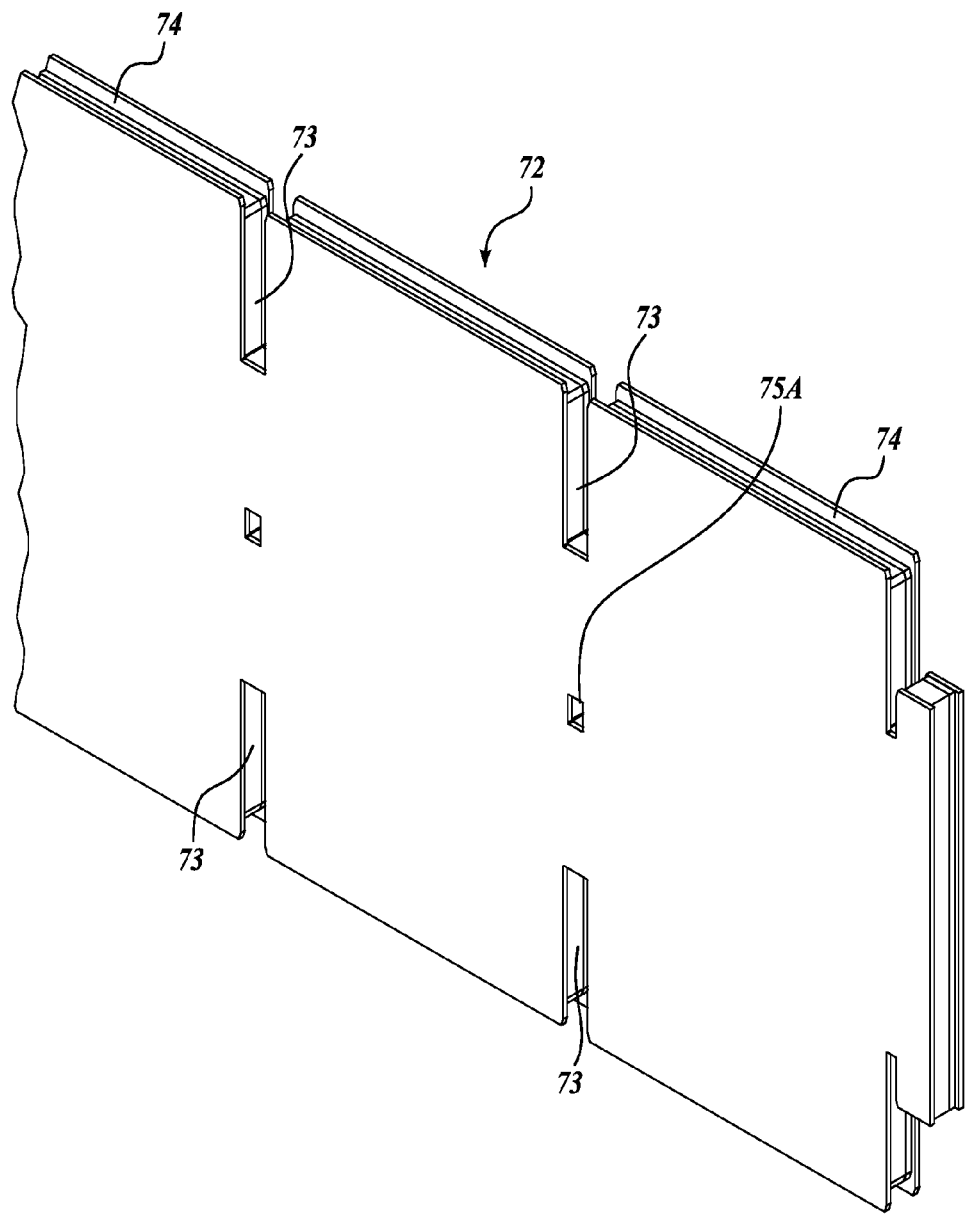
FIG. 12 is an enlarged view of a plate used in forming the basket portion shown in FIG. 11.
Figure 12A:
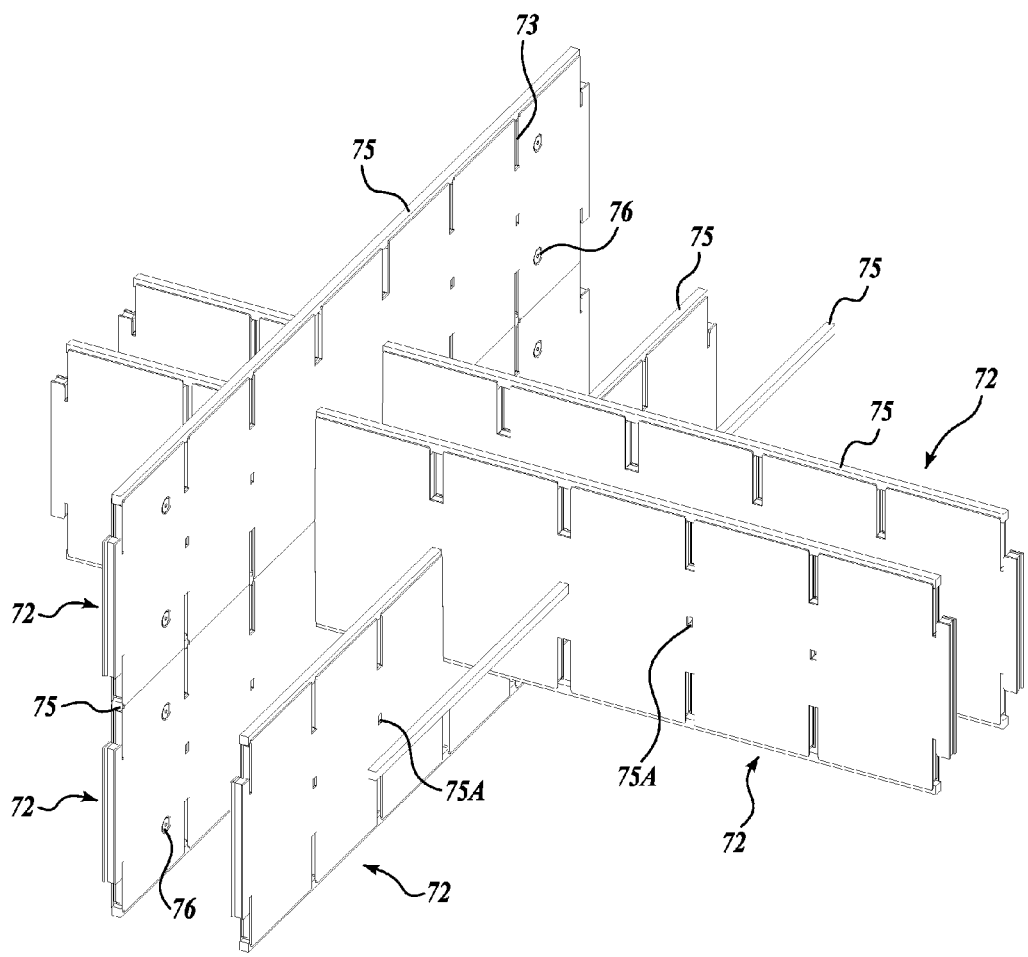
FIG. 12A is an enlarged fragmentary view of how the plates that compose the basket portions are optionally interlocked together by offsetting the edges of the interior sheets of the plate from the outer sheets of the plate so that adjacent plates can be locked together.
Figure 13:
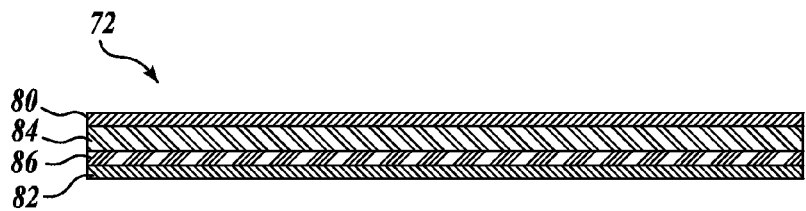
FIG. 13 is an enlarged fragmentary view of a plate used in forming the basket portion.
Figure 14:
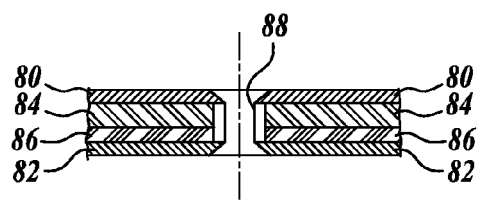
FIG. 14 is an enlarged fragmentary view of the plate shown in FIG. 13 with a cross hole formed therein.
Figure 15:
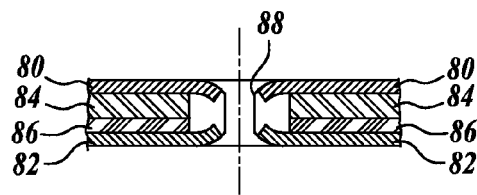
FIG. 15 is a view similar to FIG. 14 but of a different cross hole configuration.

Referring to FIGS. 11, 12 and 12A, the basket assembly 70 has a structure composed of functionally graded plates 72 that interlock in a criss-cross or "egg crate" matrix to define a plurality of tubes 74 (square or rectilinear in cross-section) for receiving individual fuel assemblies. The plates 72 are formed in a plurality of layers for structure, heat transfer, and neutron absorption as described more fully below.

Referring specifically to FIGS. 13-17, the plates 72 may include a multi-layer structure. As a non-limiting example, the plates 72 may have a four-layer structure including first and second steel outer layers 80 and 82, a heat conductor interior layer 84, and a neutron absorber layer 86. As a non-limiting example, the steel outer layers 80 and 82 may be a high strength, low alloy steel, a high-strength steel, a carbon steel, stainless steel or other comparable materials. As a non-limiting example, the heat conductor layer 84 may be manufactured from aluminum or copper or other highly heat conductive metal or material. As a non-limiting example, the neutron absorber layer 86 may be manufactured from a material whether metallic, ceramic or a composite, that contains an element that absorbs thermal neutrons. Such materials include, but are not limited to, boron, cadmium, and gadolinium. As such, the layer 86 may be composed of a metal matrix composition, such as a composite of fine boron carbide particles in an aluminum or aluminum alloy matrix. The aluminum matrix may consist of 99% pure aluminum.

Also, it is to be understood that the heat conducting function and neutron absorption function can be combined into a single layer of material that can both conduct heat and absorb neutrons. Such materials can include but cannot be limited to, aluminum or copper with embedded particles of boron carbide.

Figure 18:
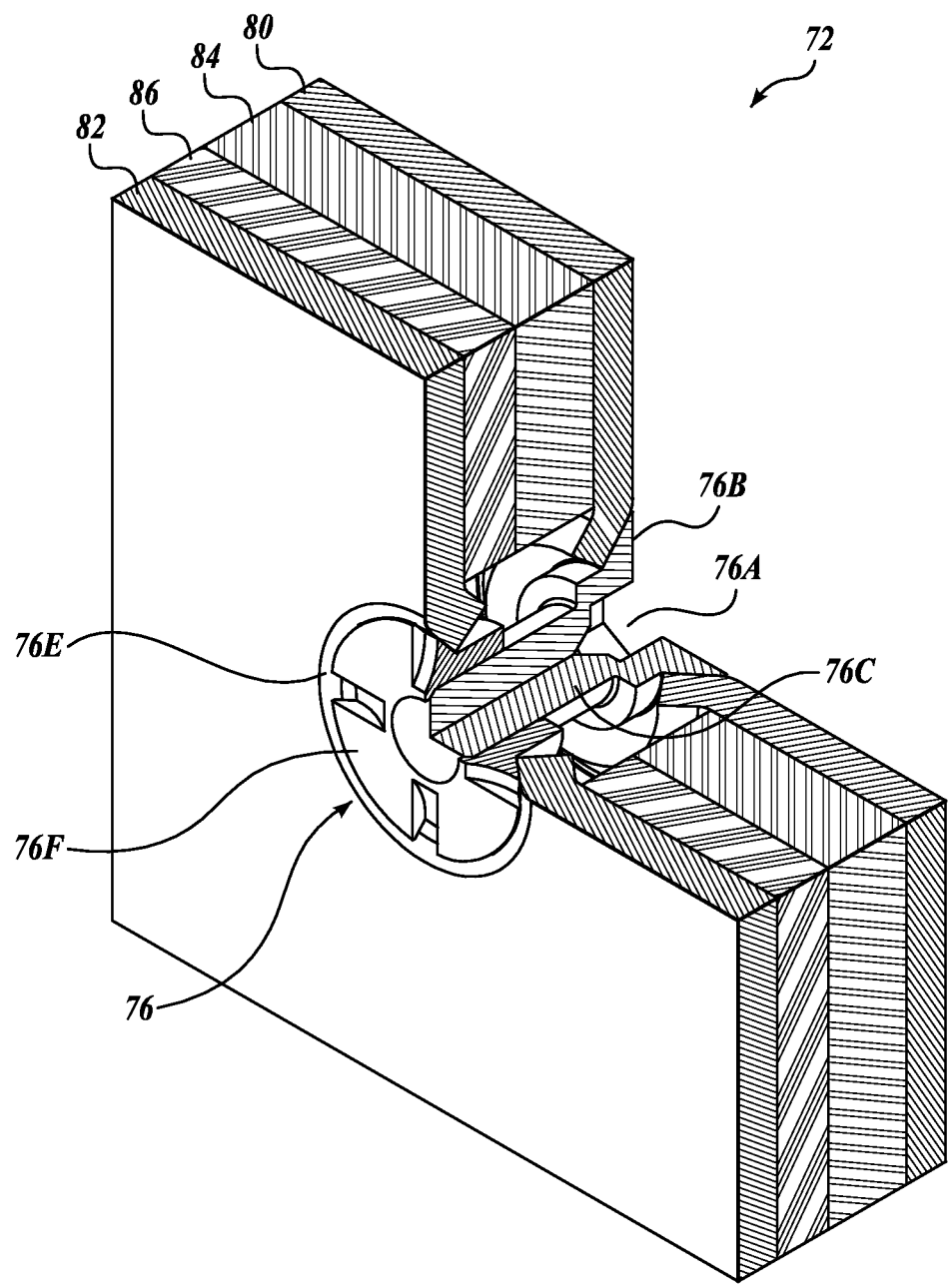
FIG. 18 is an enlarged fragmentary view of a basket plate showing one way that the plate layers can be fastened together.

The plates 72 may include flush fasteners 76 for securing the layers of the plate to each other in face-to-face relationship, see FIG. 18. Suitable fasteners 76 may include, for example, threaded fasteners, rivets or welded joins. In the illustrated embodiments of FIGS. 14 and 15, holes 88 for receiving fasteners 76 may be formed by punching, drilling or other methods in the plates 72.

Referring to FIG. 18, an exemplary threaded torque limiting fastener 76, which is flush with the exterior surfaces of the plate 72, on both sides, is shown. The fastener has a bolt section 76A composed of a beveled head 76B and a shank 76C. The threaded section 76D engages with the interior of a threaded nut 76E, which also has a beveled head 76F. The beveled heads 76B and 76F bottom against beveled counter bores formed in the layers 80 and 82. Then the fastener 76 is fully engaged the heads 76B and 76F of the fastener are flush with or beneath the outer surfaces of plate layers 80 and 82.

Figure 16:
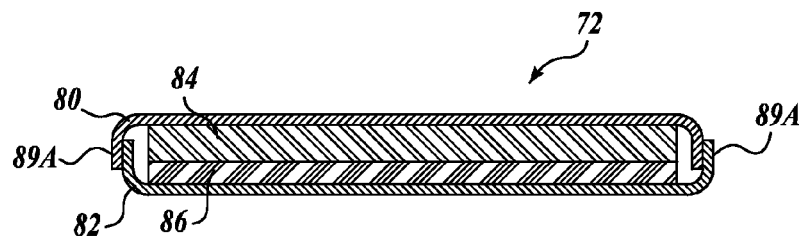
FIG. 16 is an alternative view of the plate shown in FIG. 13 showing the manner in which the exterior layers overlap each other.
Figure 17:
FIG. 17 is a view similar to FIG. 16, showing a further alternative view of the plate with the exterior layers joined together at a butt joint.

In one embodiment of the present disclosure, the layers of the plates 72 are furnace-brazed together. Exemplary constructions for the furnace-blazed plates 72 are shown in FIGS. 16 and 17. Referring to FIG. 16, the edges of layers 80 and 82 are bent around and over each other in overlapping fashion at 89A for adding buckling resistance. Referring to FIG. 17, the bent edges of layers 80 and 82 are welded to each other along the butt seam 89B to form a rigid tubular structure with the other components (layers 84 and 86) encased inside the tube.

In one embodiment of the present disclosure, the plates 72 may include a black oxide coating on one or both steel layers 80 and 82 to provide improved radiation heat transfer from the fuel assemblies (not shown) to the basket assembly 70. In addition, the outer surfaces of the plates 72 may further include a hydrophobic silicon dioxide coating to improve water shedding and thereby reduce drying time.

The plates 72 can be constructed in different thicknesses and widths. The thicknesses of the plates can depend on various factors, including the weight of the fuel being transported and stored, the amount of heat conduction desired by layer 84 as well as the level of neutron absorption desired for a layer 86.

The widths of the plate 72 can depend on the overall length of the basket assembly 70, since such length is composed of plates 72 stacked lengthwise upon each other. As a non-limiting example, the plate 70 can range in width from about 10 inches to about 16 inches or even wider.

The basket assembly 70 shown in FIG. 11 is composed of plates 72 that are fitted together in criss-cross or "egg crate" manner. Also referring to FIGS. 11, 12, and 12A, the plates 72 have transverse slots 73 that extend a quarter of the way across the width of the plate. As a consequence, when the plates 72 are fitted together so that the slots 73 of the criss-crossing plates engage each other, adjacent plates in the vertical direction mate edgewise against each other. In this manner, a plurality of vertical cells 74 are formed for the full height of the basket assembly 70. Ideally, each of the cells 74 are only slightly larger in cross-section than the nuclear fuel assemblies that are contained or stored in the basket assembly 70.

As will be appreciated at the very top and bottom of the basket assembly 70, the plates 72 are only half as wide as throughout the remaining height of the basket assembly. Moreover, the slots 73 in the upper most and lower most plates 72 extend half-way through the width of such plates. As a consequence, the bottom edges of all the lower most criss-crossing plates are on the same plane. Likewise, at the top of basket assembly 70, the upper edges of the upper most criss-crossing plates 72 are also of the same elevation.

Referring specifically to FIG. 12A, as an optional construction of basket assembly 70, the longitudinal edges of the plates 72 are formed with a groove 74 extending along the upper and lower edges of each of the plates 72. The groove is sized to receive a close fitting bar or key 75 that is sized to be very closely receivable within the opposing grooves 74 of adjacent plates 72. The rod or bar 74 passes through openings 75A formed in the plates 72 in alignment with the two opposing slots 73 of a plate 72 and half way between such opposing slots 73. As will be appreciated by the foregoing construction, the bars 72 lock the adjacent edge portions of adjacent plates 72 together to form a very rigid construction for the basket assembly 70. The width of the groove 74 can be the thickness of the plate inner layers 84 and 86. As such, the groove 74 is formed by extending the outer layers 80 and 82 beyond the edges of the inner layers 84 and 86.

Figure 19A:
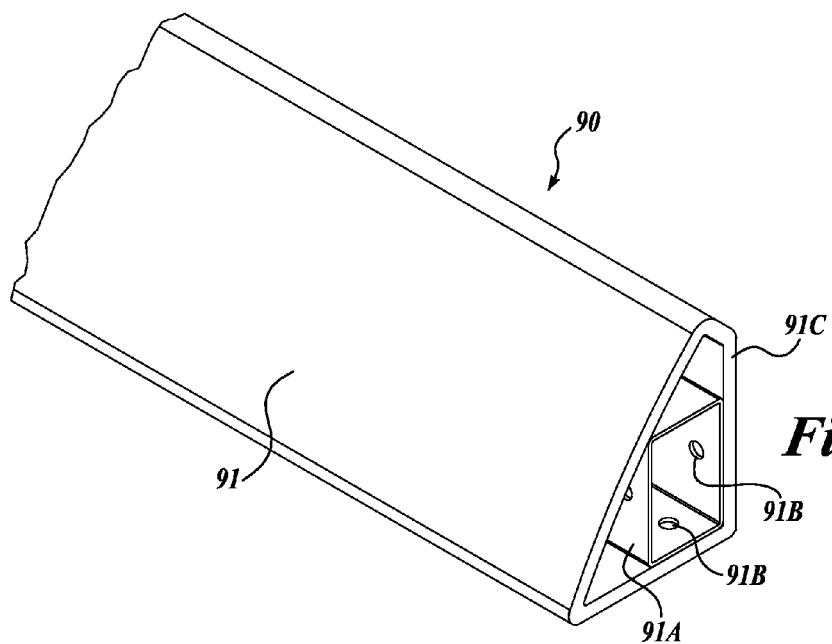
FIG. 19A is an enlarged fragmentary view of a transition rail configuration placed along the outer perimeter of the basket assembly.
Figure 19B:
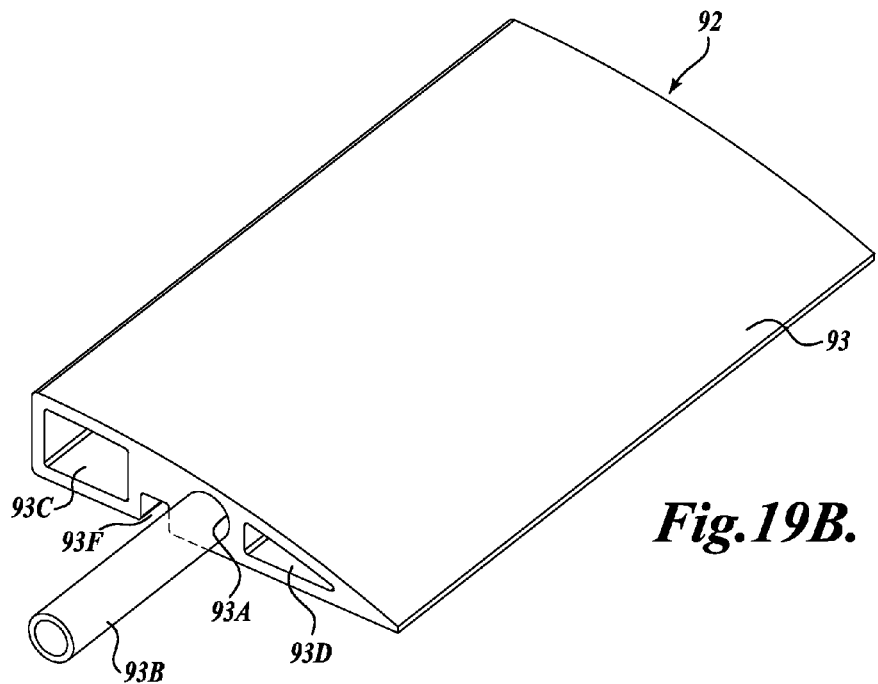
FIG. 19B is an enlarged fragmentary view of another transition rail assembly.

Referring to FIGS. 19A and 19B, transition rails 90 and 92 may be designed for placement along the outer perimeter of the basket assembly 70 to help form the cylindrical outer structural shape of the basket assembly 90 when received in a canister assembly 12, see FIG. 11. In that regard, the rails 90 and 92 may be configured as cast or extruded aluminum alloy rails to provide strength and creep resistance to the basket assembly under long term exposure to the fuel assemblies at high temperature. The transition rail 90, shown in FIG. 19A, is generally triangular in cross section and having an outer curved side or surface 91 of a transverse curvature corresponding to the overall outer curvature of basket assembly 70, shown in FIG. 11. To provide structural integrity to the rail 90, an interior bracket or brace 91A may be utilized. As illustrated in FIG. 19A, the brace 91A is shown in the form of a rectangular tubular member. Through-holes 91B are formed in brace 91A in alignment with corresponding holes formed in the adjacent wall 91C of transition rail 90 through which appropriate fasteners may be engaged. Such fasteners, shown in FIG. 11, also extend through the adjacent plates 72 of the basket assembly. It will be appreciated that this construction aids in creating the basket 70 as a very rigid structure. Other than the cross sectional area taken out by the walls of brace 91A, the interior of transition rail 90 is hollow to minimize the weight of the rail and also to allow air to pass therethrough to aid in heat dissipation. As shown in FIG. 11, two sets of rails 90 are used in each quadrant of the basket 70.

Two sets of transition rails 92 are also used in each quadrant of basket 70. The transition rails 92 are thinner in cross section than rails 90, but do include a curved outer surface 93 of a transverse curvature corresponding to the outer diameter of basket 70. The rails 92 include a longitudinal opening 93A for reception of a reinforcing tube 93B extending lengthwise through the rail. The reinforcing tube 93B is provided to help stiffen the rail 92. Of course, reinforcing members of other shapes can be used in place of tube 93B. Also, through cavities 93C and D extend lengthwise through the rail 92. These cavities help reduce the weight of the transition rail without significantly reducing the structural integrity of the rail. Moreover, air is able to flow through the cavities 93C and 93D, extending the length of the transition rail 92, thereby to help dissipate the heat generated from the fuel assemblies 20 disposed within the basket 70. The transition rail 92 is secured to adjacent plates 82 by fasteners 93E that extend through aligned openings formed in the plate 72 and in rails 92, see FIG. 11. Also, when in place, groove 93F formed in the interior wall section of transition rail 92 mate with the end portions of plates 72 that protrude beyond the furthest outward cross plate 72, for instance, as shown in FIG. 11. This interlocking relationship with the ends of the plate 72 also add to the rigidity of the construction of the basket 70.

Figure 20:
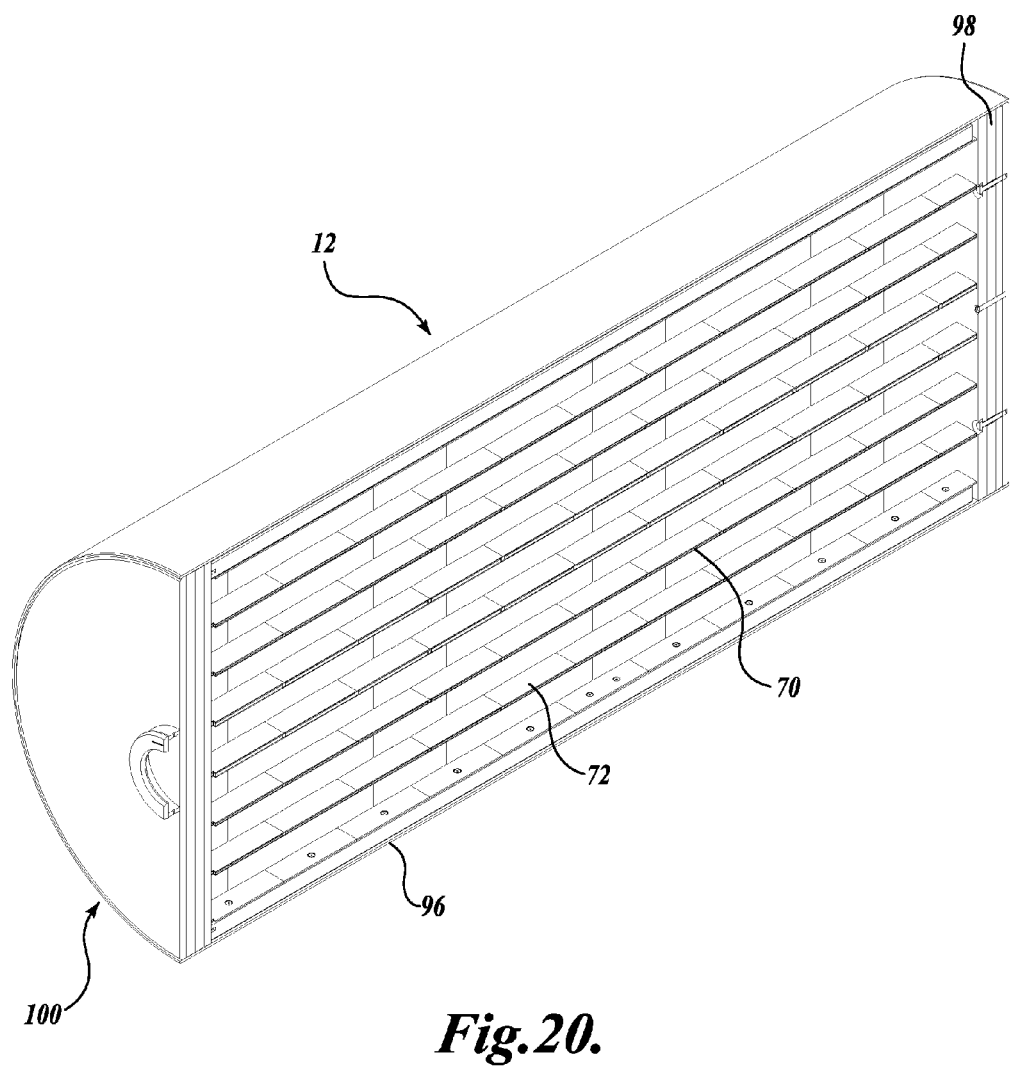
FIG. 20 is a view of a canister assembly with basket assembly 70 disposed therein.

Returning to FIG. 7, a canister assembly 12 is shown in a module 26. Referring now to the cross-sectional view of FIG. 20, the canister assembly 12 is a substantially cylindrical container having an outer shell 96 and a distal end 98 and is designed for containing the basket assembly 70 for storage and transportation of fuel. The canister assembly 12 further includes a closure assembly 100 at its proximal end, as described in greater detail below. Most lightweight reactor fuel is in the range of about 146 to 201 inches in length. As such, the canister assembly 12 is constructed at a length corresponding to the length of the reactor fuel. As discussed above with reference to FIG. 2, the canister assembly 12 must be dried after it has been removed from the pool 18. In that regard, water must drained from both the canister assembly 12 and the transfer cask 14 that surrounds the canister assembly 12. See, for example, FIG. 2.

Figure 21:
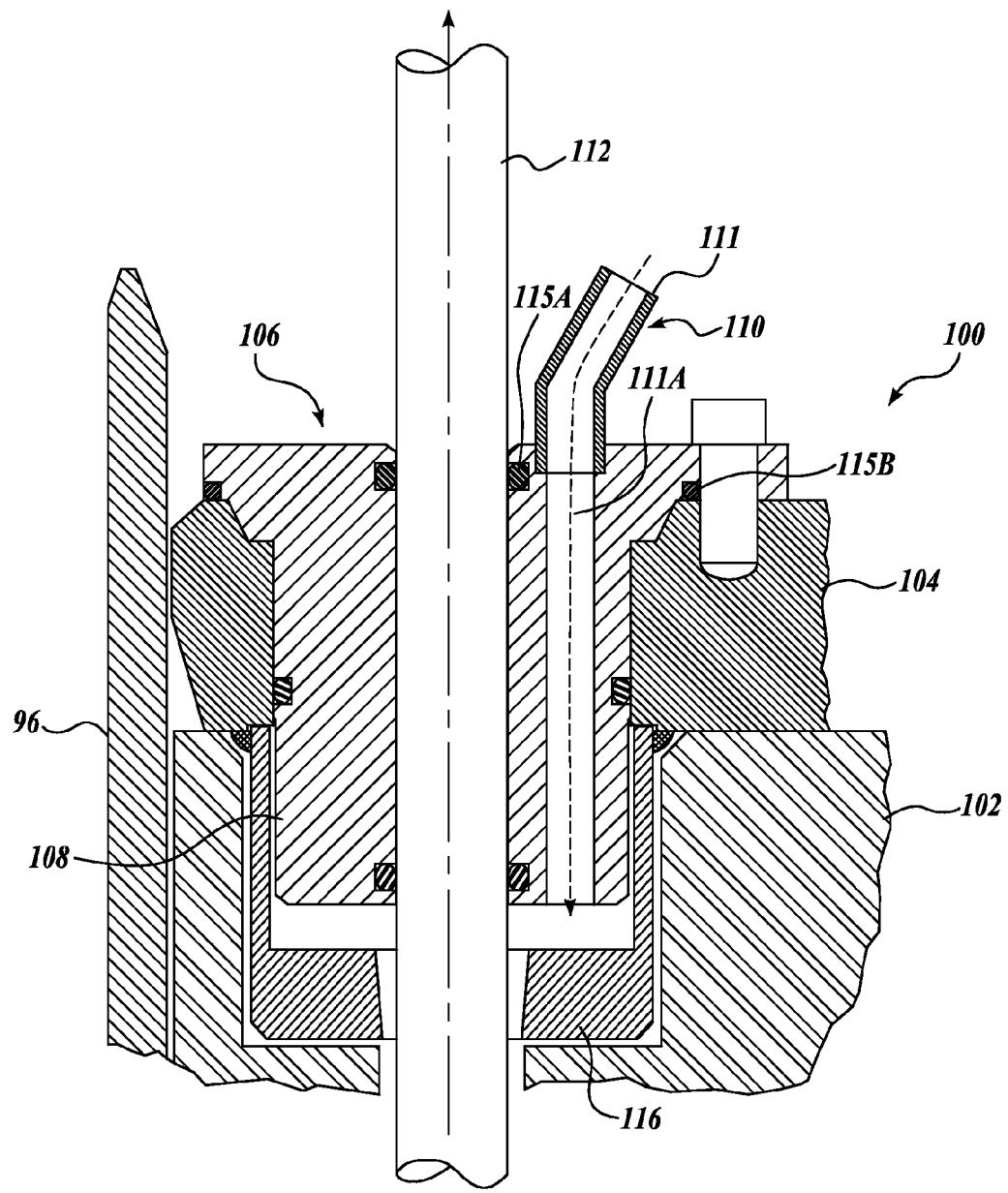
FIG. 21 discloses a drain port tool for a canister assembly.
Figure 22:
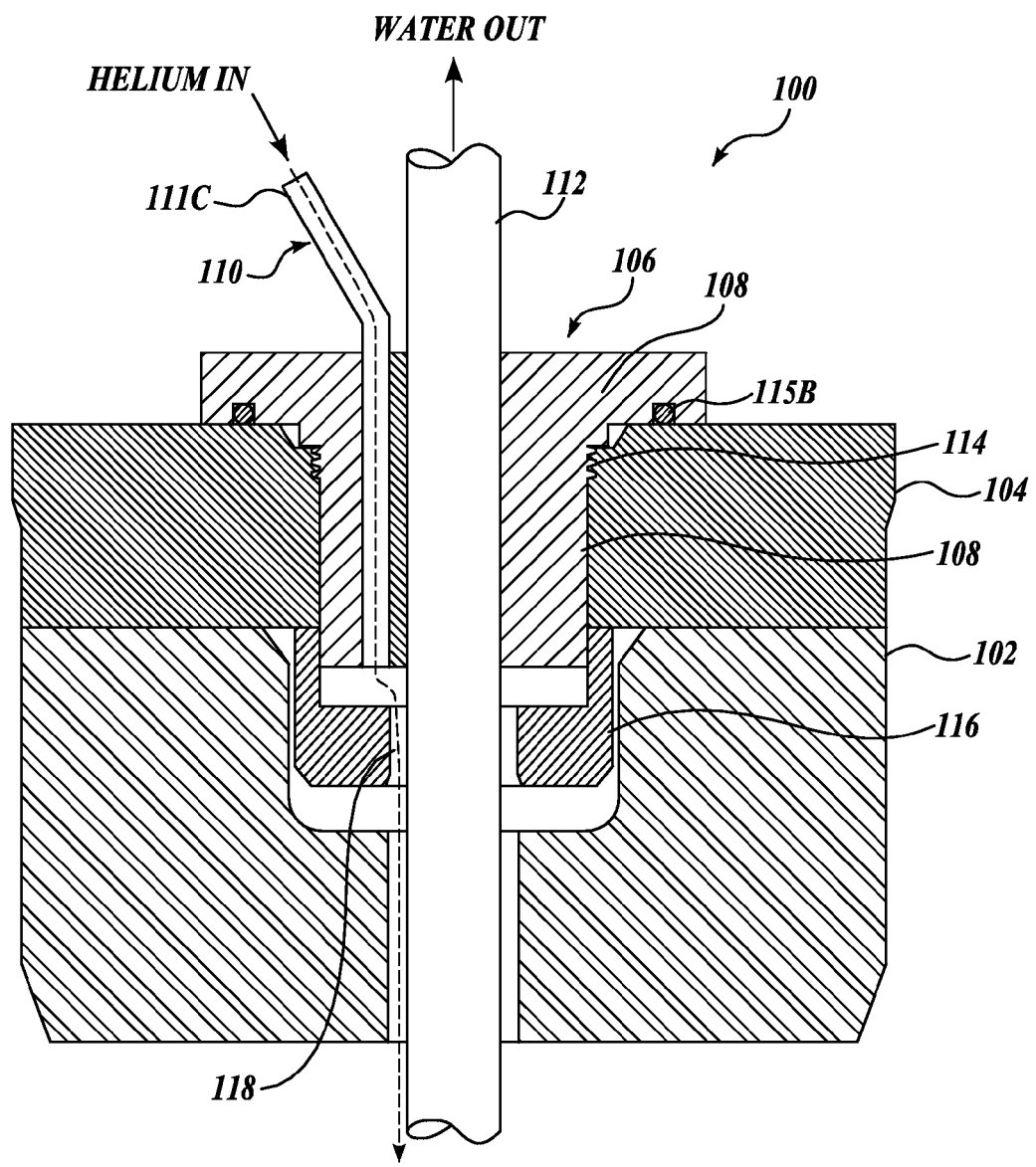
FIG. 22 is a further view of the drain port tool.
Figure 23:
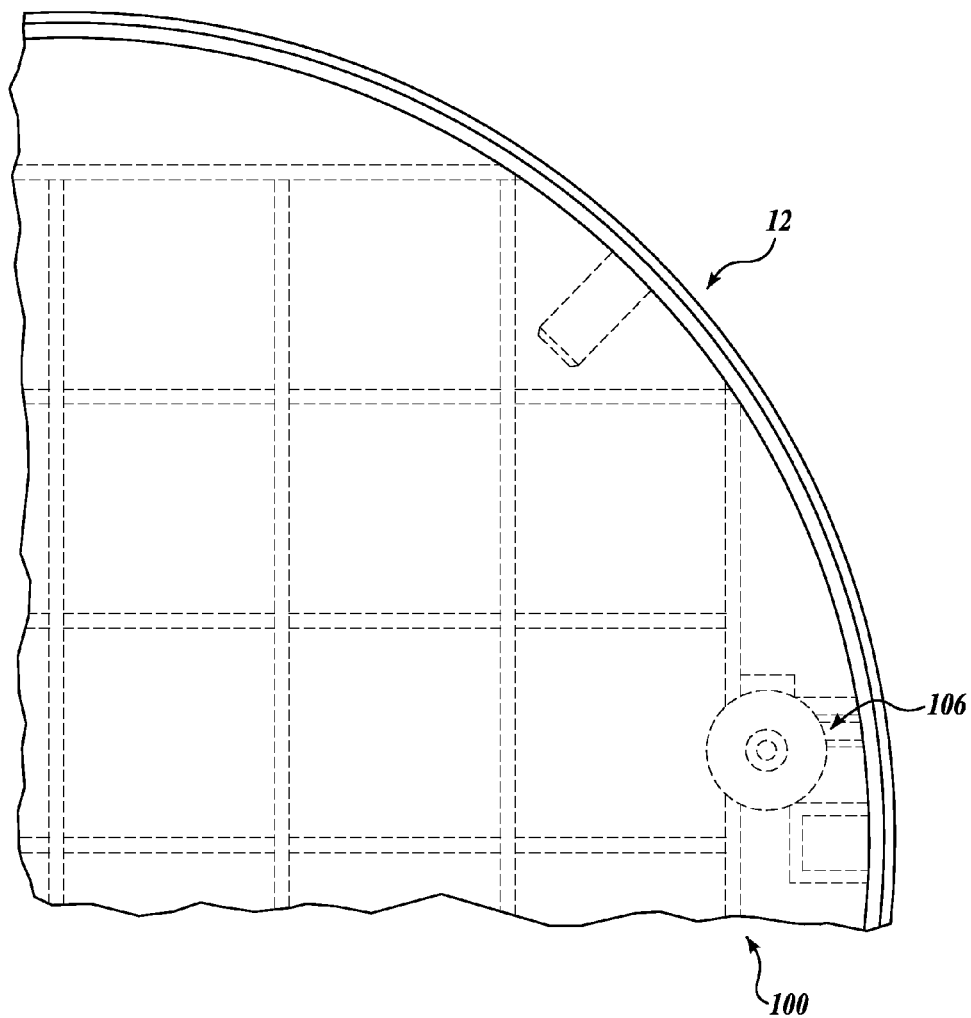
FIG. 23 shows the positioning of the drain port assembly relative to the canister assembly.

Referring to FIGS. 21-23, in accordance with one embodiment of the present disclosure, a canister assembly 12 has been designed with an end closure assembly 100 that includes a shield plug 102 and an inner top cover plate 104 outward of the shield plug and a single integrated vent and drain port tool 106. The shield plug and inner top cover plate 104 close off the proximal end of outer shell 96. The shield plug is relatively thin and can be composed of material to contain the nuclear fuel assemblies within the canister assembly. Such materials may include, for example, steel, lead, tungsten and depleted uranium. The integrated port tool 106 has the capability to drain water and also provide an inert gas (e.g., helium) cover for fuel assemblies 20. Therefore, the canister assembly 12 includes means for controlling the gas that enters the interior of the canister assembly 12 while the water is being pumped out.

The port tool 106 of FIGS. 21-23 may be configured as an adapter to replace separate drain and vent ports that are conventionally used in existing canister assemblies. In the illustrated embodiment of FIGS. 21-23, the port tool 106 generally includes an adaptor body 108 extending through inner top cover plate 104 and into the shield plug 102. The port assembly 106 also includes a vent 110 in communication with the interior of canister assembly 12 for gas supply into the canister assembly and a water removal tube 112, extending through a central passageway formed in body 108, for water to exit from the canister assembly 12. The vent 110 is composed of an outer nipple 111 that is connected to a vent passageway 114 formed in the adapter body 108. In FIG. 22, the vent 110 is shown as consisting of a tube 111C that extends through a vent passageway extending through the adapter body 108. In use, gas is supplied to the vent 110. Water may be pumped via tube 112 or forced out at tube 112 by gas pressure applied at vent 110.

The adaptor body 108 of the port tool 106 is attachable to the inner top cover plate 104 by any suitable means, including threading, a bayonet lock, screw flange, or quick thread from the top. An exemplary threaded attachment 114 is shown in the illustrated embodiment of FIG. 22. In addition, a plurality of elastomeric x-rings 115A and o-rings 115B ensure a tight seal between the port assembly 106 and the inner top cover plate 104. O-rings 115C also are disposed between water removal tube 112 and the passageway extending through adaptor body 108.

A port is formed by a cup 116 welded under the inner top cover plate 104. The cup 116 has a center hole 118 for receiving the water removal tube 112. The hole 118 has a diameter that is sized slightly larger than the outer diameter of the water removal tube 112 to provide an annular flow path for the backfill gas entering from vent 110. The water removal tube 112 may be a removable drain tube, that extends the length of the canister assembly 112.

A top view of the port tool 106 in the canister assembly 112 can be seen in FIG. 23. The port is located at the perimeter of the basket, as can be seen in hidden view through outer cover 104, as viewed from the top of FIG. 23.

Figure 24:
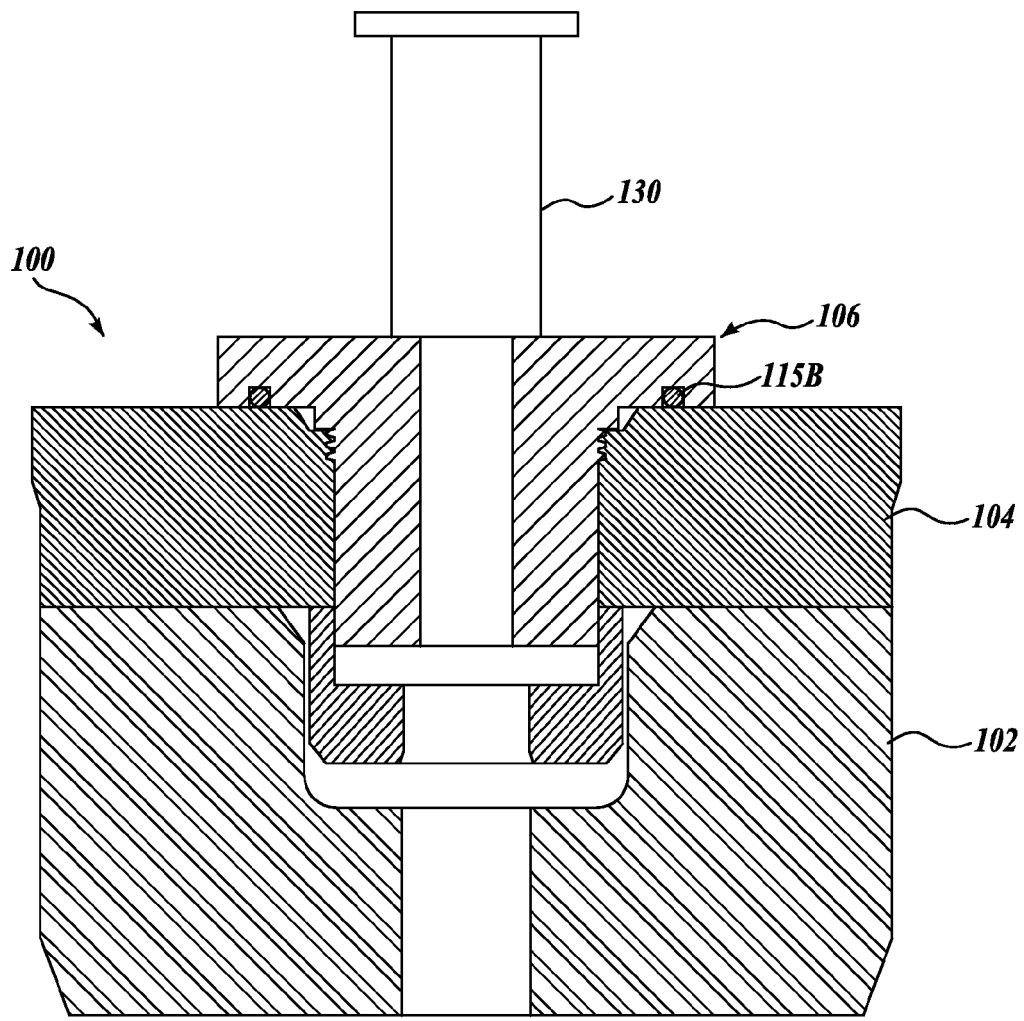
FIG. 24 is a further view of the drain port tool.
Figure 25:
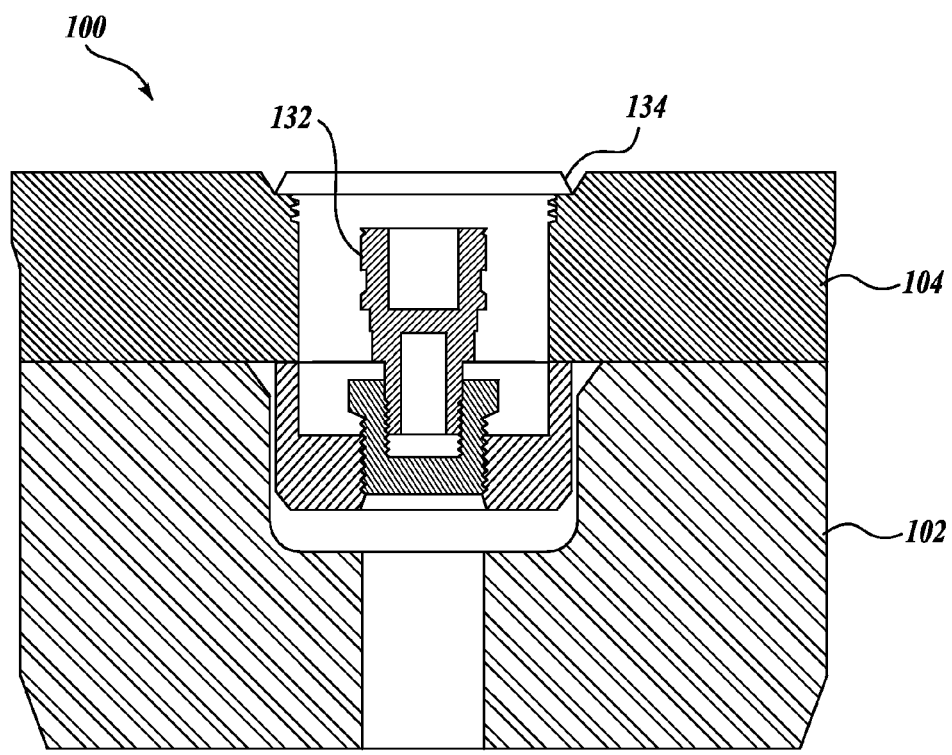
FIG. 25 is an enlarged cross-sectional view of certain aspects of the drain port assembly.

The port and port tool 106 provide advantages over existing drain ports. These advantages include reduced manufacturing costs by the ability to provide a deep port in a relatively thin lower plate rather than the thick cover plates or vent and drain block commonly used. Moreover, the port assembly of the present disclosure reduces operation time and dose by reducing the number of ports that need to be closed (from two to one), and by the use of the thick adaptor body 108 that acts as a radiation shield. By sliding the tube 112 in the adaptor body 108, the gap between the bottom of the tube and the bottom end of the canister can be adjusted to optimize the removal of aspirated droplets, thus optimizing the removal of all water from the canister assembly 12. In addition, because the tube 112 is entirely removed during vacuum drying as shown in FIG. 24, the large opening improves the conductance for vacuum drying, which also reduces drying time, optimizing the removal of all water from the canister assembly 12. In addition, the port assembly 106 improves the conductance for vacuum drying, which also reduces drying time.

Fuel loading operations will now be described. After fuel has been loaded into the canister assembly 12 (see, for example, FIG. 1), the shield plug 102 (shown in FIGS. 21 and 22) is installed while the canister assembly 12 and surrounding cask assembly 14 still remains under water. Rotational orientation of the canister assembly within the cast assembly is controlled by a key on the side wall of the canister assembly 12. The shield plug 102 does not engage a drain tube.

A short hose is inserted into the canister assembly 112 to drain the water as needed from the canister assembly 12 and the inner top 104 cover is installed after the cask assembly 14 has been set down. The inner top cover 104 is then welded, and the drain tube 112 and port tool 106 are then installed.

After the drain tube 112 and port tool 106 have been installed, the drain tube 112 is pushed to the bottom of the canister 112, then raised up about ⅜ inch (10 mm) and secured with a locking collar, not shown. The inert gas (e.g., helium) supply is attached to the vent tube 110, and the water pump is attached to the water drain tube 112. Gas flow and water pumping is initiated. In that regard, the gas pressure under the port assembly 106 should be slightly positive.

At the first sign of cavitation (air in the water pump), the drain tube 112 is lowered and pumping is continued until water is no longer being pumped out. The water pump is them disconnected from the drain tube 112 and a vacuum pump with a water trap is attached to the drain tube 112.

Gas continues to be supplied through the vent tube 110 while gas and water are removed from the canister assembly 12 by the vacuum pump. The drain tube 112 can be raised and lowered slightly during vacuuming to find the ideal gap between the drain tube 112 and the bottom of the canister assembly 12.

Figure 26:
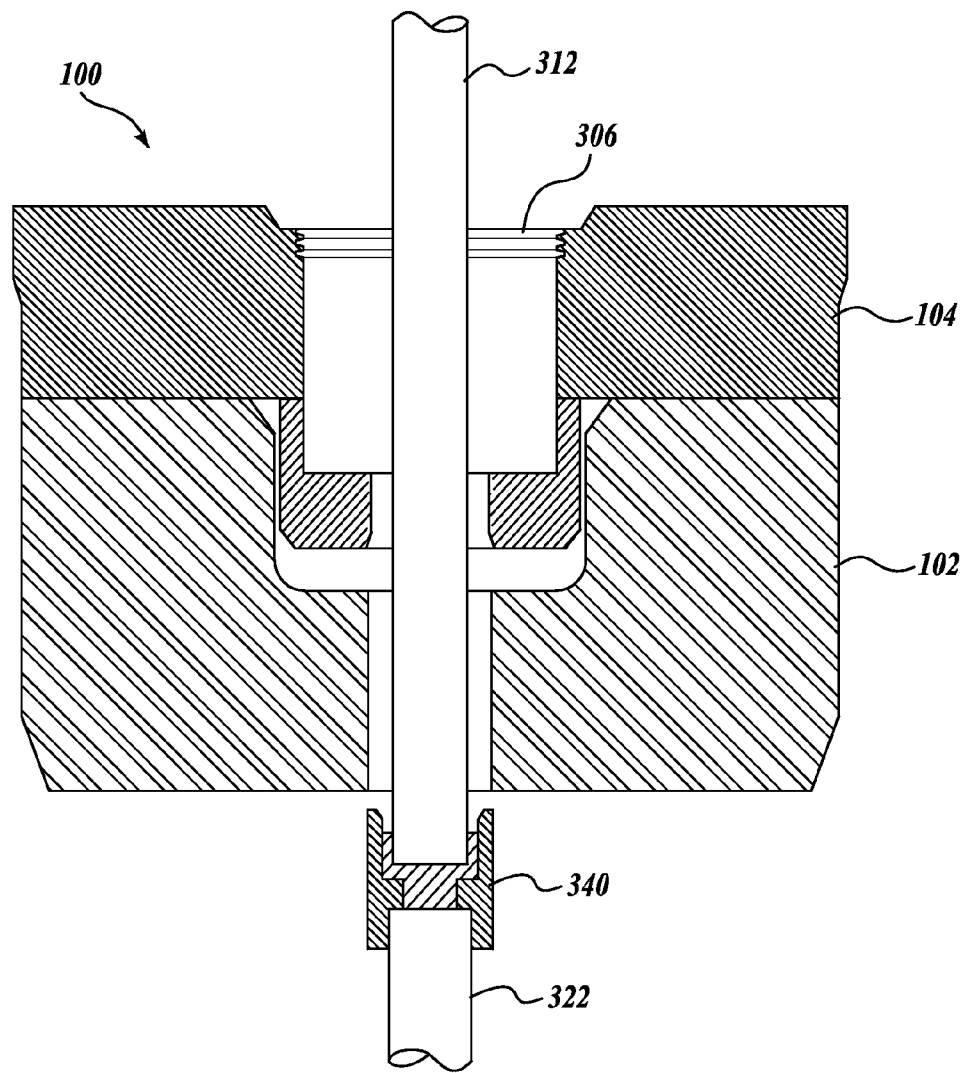
FIG. 26 is an enlarged fragmentary view showing other aspects of the drain port assembly.

Referring now to FIG. 26, another embodiment of a port assembly 306 for a canister assembly 12 is shown. In the embodiment of FIG. 26, the port assembly 306 includes a permanent tube 322 in the canister assembly 12 with a cup 340. A short removable tube 312 is connectable to the permanent tube 322 for drain operation, and removed for vacuum drying. The tube section 312 is comparable to the upper end of tube 112, discussed above. The permanent tube 322 in the canister assembly 12 connects with the threaded cup 340. Alternatively, the cup can be permanently affixed to tube section 312. The cup 340 can move enough to self align. The permanent tube 322 can also move up and down, but does not rotate and it does not engage the shield plug or any other lid component other than the tube 312 that is part of the port tool 106.

INDUSTRIAL APPLICABILITY

The system described herein can be used to provide a solution to the problem of storage of irradiated fuel assemblies. The system is particularly appropriate for use as an interim solution to the irradiated fuel storage problem until provided by governmental authorities. Accordingly, the present disclosure provides for a relatively inexpensive temporary storage facility for irradiated fuel assemblies. The system uses and reuses existing casks to transfer canisters with the irradiated fuel assemblies to modules 26 for near-term storage. Further there is no requirement for a lifting crane at the storage site, because horizontal loading and unloading is enabled. In addition, the fuel canisters 12 can be comprised of a thin-walled material, because the canister is always protected either by the module 26 or by the transfer cask 14.

In view of the use of existing technology and equipment, investment in horizontal dry storage module 26 can be spread over a number of years, because the modules 26 need only be fabricated and positioned as they are required. Also, when appropriate long-term solutions for the storage of irradiated fuel assemblies have been reached, the modules 26 can be easily deactivated and the assemblies still inside the canisters can be transported to the permanent storage facility.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A canister for the transportation and storage of nuclear fuel assemblies, comprising a basket assembly receivable into a canister shell, the basket assembly comprising:
   a plurality of interlocking structural plates that are disposed in spaced parallel relationship to each other in a first direction and a plurality of structural plates disposed in a second direction transverse to the first direction;
   said structural plates comprising portions defining spaced apart transverse slots formed along the structural plates, with the slots of the structural plates disposed in a first direction engaging with the slots of the structural plates disposed in the second transverse direction; and
   wherein the structural plates include a plurality of layers comprising a first layer composed of structural material, a second layer composed of a heat conducting material selected from the group consisting of aluminum and copper, and a third layer composed of a neutron absorbing material, wherein the third layer is between the first and second layers, wherein each of the first, second, and third layers include aligned transverse slots, and wherein the first, second, and third layers of the structural plates extending in the second transverse direction extend continuously from a first proximity with the inner surface of the canister shell to a second proximity with the inner surface of the canister shell, wherein the second proximity is distanced from the first proximity.

2. The canister according to claim 1, wherein the first and second layers of the structural plates are formed to encase the inner layer of the structural plates.

3. The canister according to claim 2, wherein the margins of at least the first layer of the structural plates tends over the edges of the third layer and is joined to the first layer of the opposite side of the structural plate.

4. The canister according to claim 1, wherein the first layer is composed of material selected from the group consisting of a high strength steel, a low alloy steel, a high strength and low alloy steel, a carbon steel, and stainless steel.

5. The canister according to claim 1, wherein the heat conducting layer is composed of at least one material selected from the group consisting of aluminum and copper.

6. The canister according to claim 1, wherein the neutron absorbing layer of the structural plate is a metallic, ceramic, or composite material containing an element that absorbs thermal neutrons.

7. The canister according to claim 1, wherein the layers of the structural plate are fastened together in face-to-face relationship to each other.

8. The canister according to claim 7, wherein the layers of the structural plate are fastened together by fasteners selected from the group consisting of: threaded fasteners, rivets, and weld pins.

9. The canister according to claim 1, further comprising an elongated locking key extending along and engaging with adjacent edge portions of adjacent structural plates to lock said adjacent edge portions together and to align the adjacent edge portions of the structural plates together.

10. The canister according to claim 9, wherein grooves are formed along the edge portions of the structural plates, said grooves are sized to closely receive the locking key therein, said locking key closely receivable within the grooves of the adjacent edge portions of adjacent structural plates.

11. The canister according to claim 9, wherein through holes are formed in the structural plates whereby the locking key passes through the through holes of the structural plates that extend transversely to the length of the locking keys.

12. The canister according to claim 1, wherein the exterior surface of the structural plates are treated to enhance radiative heat transfer from the fuel assemblies stored in the canister.

13. The canister according to claim 1, wherein the structural plates are treated with a hydrophobic coating to facilitate drying of the structural plates.

14. The canister according to claim 1, further comprising transition rails extending lengthwise of the canister at the outer perimeter of the basket assembly to interconnect the structural plates.

15. The canister according to claim 14, wherein the transition rails have an outer curvature in the direction transverse to the length of the transition rails that correspond to the circumference of the canister.

16. The canister according to claim 15, wherein the transition rails are at least in part hollow to receive a stiffening structure engageable within the hollow interior of the transition rails to enhance the structural integrity and rigidity of the transition rails.

17. A canister for the transportation and storage of nuclear fuel assemblies, comprising a basket assembly receivable into a canister shell, the basket assembly comprising:
   a plurality of interlocking structural plates that are disposed in spaced parallel relationship to each other in a first direction and a plurality of structural plates disposed in a second direction transverse to the first direction;
   said structural plates comprising portions defining spaced apart transverse slots formed along the structural plates, with the slots of the structural plates disposed in a first direction engaging with the slots of the structural plates disposed in the second transverse direction, wherein the structural plates extending in the second transverse direction extend continuously from a first proximity with the inner surface of the canister shell to a second proximity with the inner surface of the canister shell, wherein the second proximity is distanced from the first proximity; and
   wherein the structural plates include a plurality of layers comprising a first layer composed of material selected from the group consisting of a high strength steel, a low alloy steel, a high strength and low alloy steel, a carbon steel, and stainless steel, a second layer composed of a heat conducting material selected from the group consisting of aluminum and copper, and a third layer including a neutron absorbing material, wherein the third layer is between the first and second layers, wherein each of the first, second, and third layers include aligned transverse slots.

* * * * *